United States Patent
Inada et al.

(10) Patent No.: US 10,559,089 B2
(45) Date of Patent: Feb. 11, 2020

(54) INFORMATION PROCESSING APPARATUS AND INFORMATION PROCESSING METHOD

(71) Applicant: Sony Interactive Entertainment Inc., Tokyo (JP)

(72) Inventors: Tetsugo Inada, Tokyo (CA); Hirofumi Okamoto, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 243 days.

(21) Appl. No.: 15/740,639

(22) PCT Filed: Aug. 19, 2016

(86) PCT No.: PCT/JP2016/074207
§ 371 (c)(1),
(2) Date: Dec. 28, 2017

(87) PCT Pub. No.: WO2017/033853
PCT Pub. Date: Mar. 2, 2017

(65) Prior Publication Data
US 2018/0189975 A1    Jul. 5, 2018

(30) Foreign Application Priority Data
Aug. 26, 2015    (JP) ................................ 2015-167238

(51) Int. Cl.
*G06T 7/73*    (2017.01)
*G06T 1/00*    (2006.01)
(Continued)

(52) U.S. Cl.
CPC .................. *G06T 7/74* (2017.01); *G01C 3/08* (2013.01); *G01C 3/085* (2013.01); *G06T 1/00* (2013.01);
(Continued)

(58) Field of Classification Search
None
See application file for complete search history.

(56) References Cited

U.S. PATENT DOCUMENTS 6,563,999 B1 *    5/2003    Suzuoki .................. A63F 13/10
                                                        386/241
7,209,149 B2 *    4/2007    Jogo ...................... G06F 3/0481
                                                        345/619
(Continued)

FOREIGN PATENT DOCUMENTS

JP    1999149557 A    6/1999
JP    2008216126 A    9/2008
(Continued)

OTHER PUBLICATIONS

International Search Report for corresponding PCT Application No. PCT/JP2016/074207, 4 pages, dated Sep. 27, 2016.
(Continued)

*Primary Examiner* — Nancy Bitar
(74) *Attorney, Agent, or Firm* — Matthew B. Dernier, Esq.

(57) ABSTRACT

An image acquisition block of an information processing apparatus acquires stereo images taken by a first camera and a second camera that make up an imaging apparatus. An input information acquisition block accepts a user manipulation. A first positional information acquisition block of a positional information generation block identifies an approximate position of an object to be imaged through predetermined means. A second positional information acquisition block determines an estimated distance range of a target on the basis of the identified approximate position of the object to be imaged, detects corresponding points by executing block matching on stereo images thorough only a search range corresponding to the determined estimated distance range, and obtains a position of the target with high resolution and accuracy. An output information generation block generates output data on the basis of the position of that target and outputs the generated output data.

13 Claims, 12 Drawing Sheets

(51) Int. Cl.
*G06T 7/60* (2017.01)
*G01C 3/08* (2006.01)
*G06T 7/593* (2017.01)

(52) U.S. Cl.
CPC ............... *G06T 7/593* (2017.01); *G06T 7/60* (2013.01); *G06T 2207/10012* (2013.01); *G06T 2207/10028* (2013.01); *G06T 2207/20021* (2013.01)

(56) References Cited

U.S. PATENT DOCUMENTS

| | | |
|---|---|---|
| 9,438,877 B2 | 9/2016 | Wakabayashi |
| 9,715,718 B2 * | 7/2017 | Ohba .................. G06T 3/40 |
| 2014/0009577 A1 | 1/2014 | Wakabayashi |

FOREIGN PATENT DOCUMENTS

| | | | |
|---|---|---|---|
| JP | 2008309637 A | | 12/2008 |
| JP | 2012002683 A | | 1/2012 |
| JP | 2012008584 A | | 1/2012 |
| JP | 2012212428 A | | 11/2012 |
| JP | WO2019082797 | * | 2/2019 |
| WO | 2007050885 A2 | | 5/2007 |

OTHER PUBLICATIONS

Notification of Reasons for Refusal for corresponding JP Application No. 2015-167238, 18 pages, dated Dec. 4, 2018.
Partial Supplemental Search Report for corresponding EP Application No. 16839200, 14 pages, dated Aug. 1, 2019.

* cited by examiner

FIG. 6
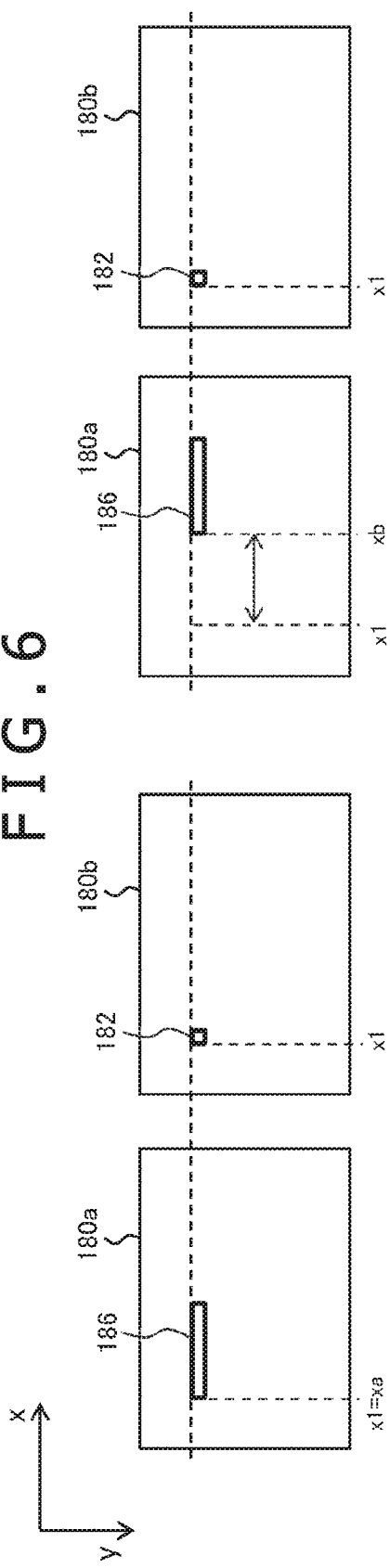
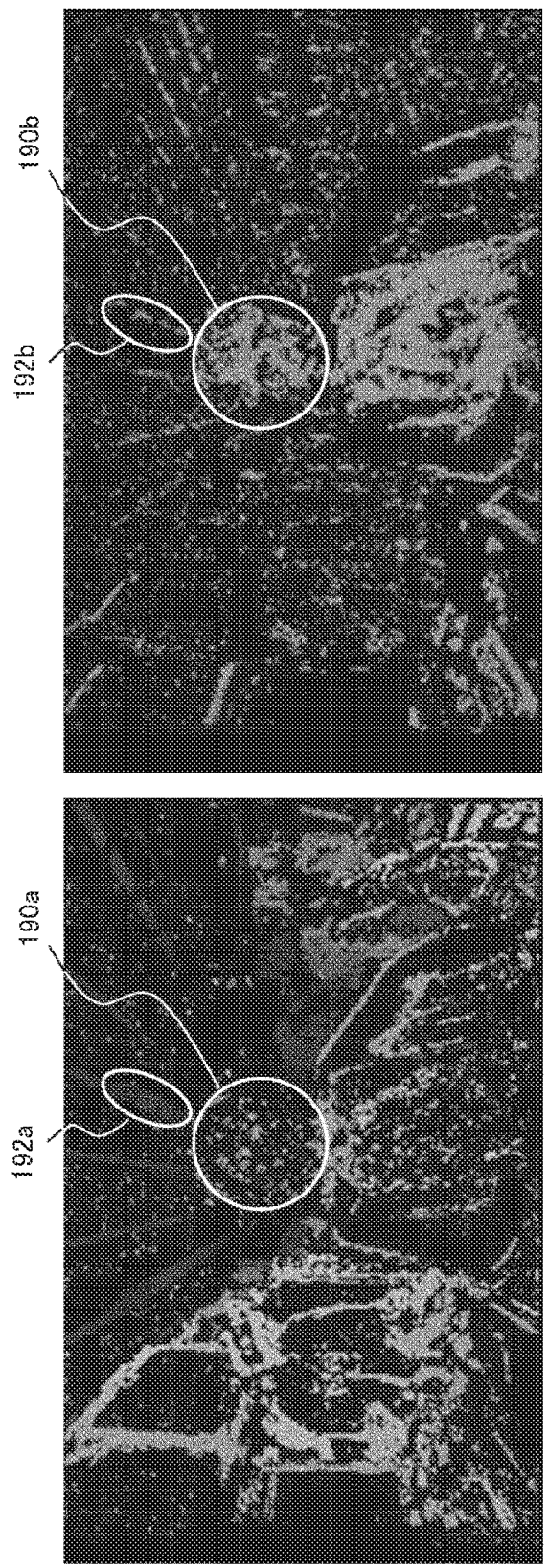

INFORMATION PROCESSING APPARATUS AND INFORMATION PROCESSING METHOD

TECHNICAL FIELD

The present invention relates to a technology of recognizing a position and a motion of an object by use of a taken image.

BACKGROUND ART

Recently, installing cameras on personal computers, game machines, and so on and taking the images of users for use in a variety of forms are generally practiced. For example, such technologies of transmitting an image of a user as it is to a mate thereof through a network as television telephone, video chat, and the like and technologies recognizing a motion of a user by image analysis so as to provide input information for games and information processing are practically used (refer to PTL 1 below, for example). Further, in these days, the accurate detection of a motion of an object in a three-dimensional space including a depth direction allows the realization of games and image expressions that provide the sense of presence higher than before.

For a general technique of obtaining a position of an object in a three-dimensional space, a stereo image technique is known. In the stereo image technique, corresponding points are detected from stereo images of a same space simultaneously taken with two cameras horizontally separated from each other by a known interval and, on the basis of a resultant parallax between the detected points, a distance from an imaged surface of an object is computed by use of the principle of triangulation.

CITATION LIST

Patent Literature

[PTL 1] WO 2007/050885 A2 Publication

SUMMARY

Technical Problems

For the detail and correct acquisition of the positional information of an object through a stereo image technique, use of a stereo image of high resolution and detection of corresponding points by sophisticated computation technique may be required, thereby obviously increasing the load of processing. On the other hand, in a mode in which information processing is executed on the basis of the motion of an object and a result of the processing is expressed by an image or the like, it is required to update the positional information at a frequency corresponding to a frame rate. Hence, the compatibility between the acquisition accuracy of positional information and the acquisition speed of positional information always presents a serious problem.

The present invention has been made to solve the above problems, and an object of the present invention is to provide a technology of accurately and quickly acquiring the positional information of an object in a three-dimensional space.

Solution to Problems

One mode of the present invention relates to an information processing apparatus. This information processing apparatus includes an image acquisition block configured to acquire data of stereo images with a same space taken by left and right cameras having a known interval therebetween; and a positional information generation block configured to detect corresponding points by executing block matching on a reference block set to one of the stereo images for detecting an area having a high similarity degree within a search range set to the other of the stereo images, generate positional information including a distance of a target from the camera on the basis of an obtained parallax, and output the generated positional information. The positional information generation block determines an estimated distance range of a target from the camera, restrictively sets a search range by a position and a length corresponding to the determined estimated distance range and then executes the block matching.

Another mode of the present invention relates to an information processing method. This information processing method includes steps of acquiring, from an imaging apparatus, data of stereo images with a same space taken by left and right cameras having a known interval therebetween; and detecting corresponding points by executing block matching on a reference block set to one of the stereo images for detecting an area having a high similarity degree within a search range set to the other of the stereo images, generating positional information including a distance of a target from the camera on the basis of an obtained parallax, and outputting the generated positional information. The step of generating positional information determines an estimated distance range of a target from the camera, restrictively sets a search range by a position and a length corresponding to the determined estimated distance range and then executes the block matching.

It is to be noted that also arbitrary combinations of the components described above and conversions of the representation of the present invention between a method, an apparatus, a system, a computer program, a recording medium in which the computer program is recorded and so forth are effective as modes of the present invention.

Advantageous Effect of Invention

According to the present invention, the information processing on the basis of the position and motion of an object in a taken image can be realized at high speeds and with a high accuracy.

BRIEF DESCRIPTION OF DRAWINGS

FIG. 6 depicts diagrams indicative of depth images of an acquisition result of positional information obtained when setting positions in a limited search range in the present embodiment are made different.

DESCRIPTION OF EMBODIMENT

Figure 1:
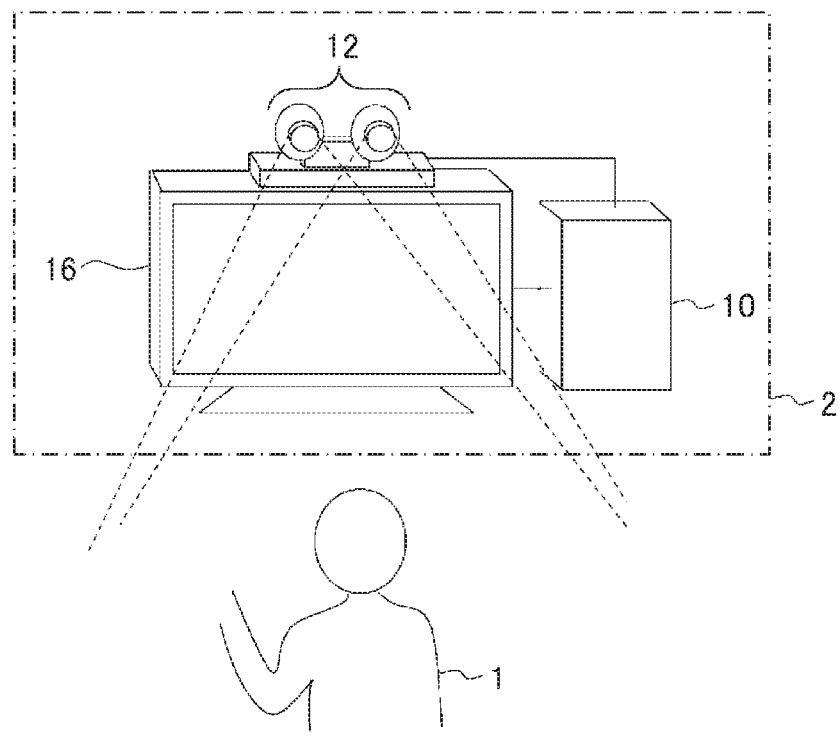
FIG. 1 is a diagram illustrating an example of a configuration of an information processing system to which the present embodiment is applicable.

Now, referring to FIG. 1, there is illustrated an example of a configuration of an information processing system to which the present embodiment is applicable. An information system 2 includes an imaging apparatus 12 having two units of cameras for taking images of an object such as a user 1, an information processing apparatus 10 executing information processing in accordance with a user request on the basis of a taken image, and a display apparatus 16 outputting image data obtained as a result of the processing done by the information processing apparatus 10. The information processing apparatus 10 may be connected to a network such as the Internet.

The information processing apparatus 10, the imaging apparatus 12, and the display apparatus 16 may be interconnected with a wired cable or a wireless LAN (Local Area Network) for example. Any two or all of the imaging apparatus 12, the information processing apparatus 10, and the display apparatus 16 may be combined into a unitized configuration. Further, the imaging apparatus 12 may not always be installed on the display apparatus 16. Still further, the number of objects and the types thereof are not restricted.

The imaging apparatus 12 has a configuration of a stereo camera in which two digital video cameras each having an imaging element such as a CCD (Charge Coupled Device) or a CMOS (Complementary Metal Oxide Semiconductor) are horizontally arranged with a known interval. Each of the two digital video cameras images an object existing in a same space from a horizontal position at a predetermined frame rate. In what follows, a pair of frames imaged as described above is also referred to as a "stereo image."

The information processing apparatus 10 detects the position of an object in a three-dimensional space that includes an image plane and a depth direction from the camera. A result of the detection is used for the later processing that uses the position and the motion of the object as input information. For example, the detection result is used to realize an AR (Augmented Reality) by which a virtual object responsive to the motion of a hand or a leg of the user 1 who is an object is drawn on a taken image. Alternatively, a motion of the user 1 may be tracked to be reflected to a game image or converted into the command input of information processing. Thus, the purpose of use of the information related with the position of an object obtained by the present embodiment is not especially restricted.

The display apparatus 16 displays a result of the processing executed by the information processing apparatus 10 as an image as required. The display apparatus 16 may be a television receiver having a display for outputting an image and a speaker for outputting sound; for example, a liquid crystal television receiver, a plasma television receiver, or a PC (Personal Computer) display. As described above, since the contents of the processing finally executed by the information processing apparatus 10 and an image to be displayed thereby are not especially restricted by the purpose of use thereof, the following mainly describes the processing for detecting the position of an object to be executed by the information processing apparatus 10.

Figure 2:
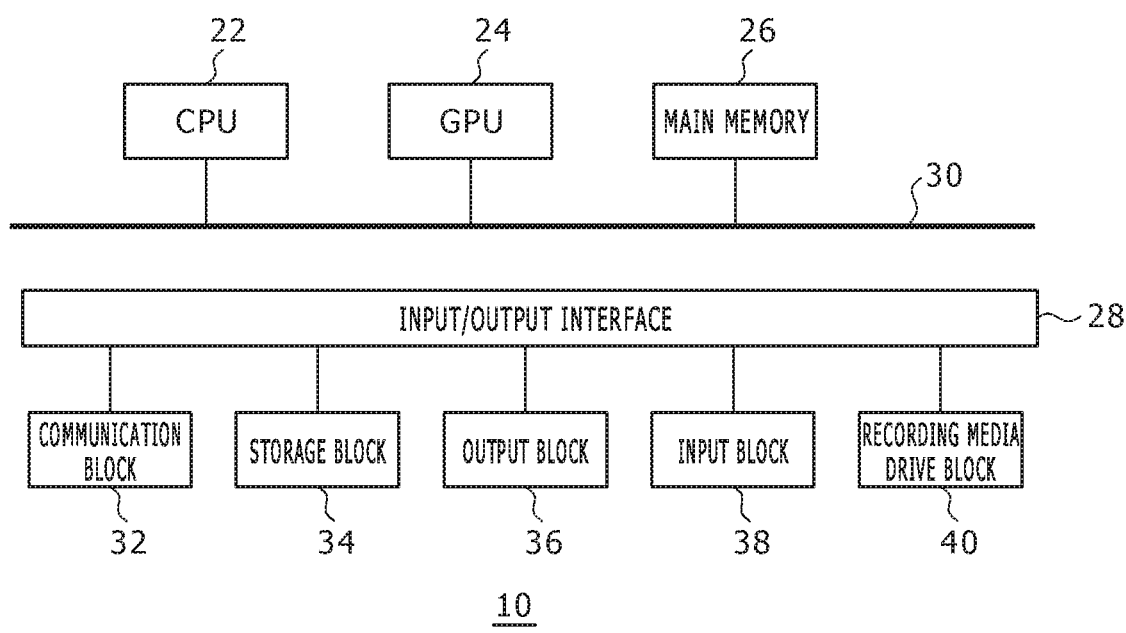
FIG. 2 is a diagram illustrating an internal circuit configuration of an information processing apparatus in the present embodiment.

Referring to FIG. 2, there is illustrated an internal circuit configuration of the information processing apparatus 10. The information processing apparatus 10 includes a CPU (Central Processing Unit) 22, a GPU (Graphics Processing Unit) 24, and a main memory 26. The main memory 26 is made up of a RAM (Random Access Memory) and stores programs and data that are necessary for executing the processing. Each of these blocks is interconnected through a bus 30. The bus 30 is further connected to an input/output interface 28.

Connected to the input/output interface 28 are a communication block 32 made up of peripheral device interfaces such as USB (Universal Serial Bus) and IEEE (Institute of Electrical and Electronic Engineers) 1394, a storage block 34 made up of a hard disc drive and a nonvolatile memory, an output block 36 outputting data to output apparatuses such as the display apparatus 16 and a speaker, an input block 38 through which data is entered from input apparatuses such as a keyboard, a mouse, the imaging apparatus 12, and microphone, and a recording media drive block 40 driving removable recording media such as a magnetic disc, an optical disc, or a semiconductor memory.

The CPU 22 executes information processing on the basis of an operating system stored in the storage block 34 and various other programs read from a removable recording medium and loaded into the main memory 26 or downloaded through the communication block 32. In addition, the CPU 22 controls the processing and signal transmission in various circuits internal to the information processing apparatus 10. The GPU 24 has a geometry engine function and a rendering processor function and executes drawing processing as instructed for drawing from the CPU 22 and stores the data of display images into a frame buffer not illustrated. Then, the GPU 24 converts the data of a display image concerned into a video signal and outputs the video signal to the output block 36 and so on.

Figure 3:
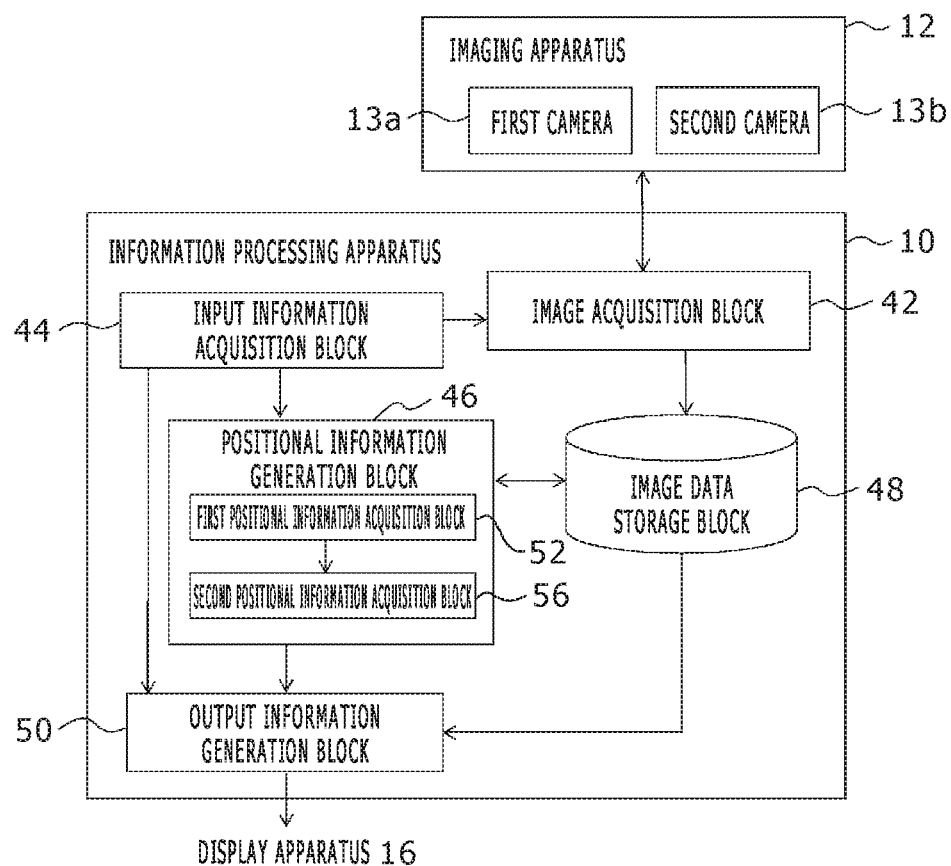
FIG. 3 is a diagram illustrating a functional block configuration of an imaging apparatus and the information processing apparatus in the present embodiment.

Referring to FIG. 3, there is illustrated a functional block configuration of the imaging apparatus 12 and the information processing apparatus 10. In terms of hardware, each functional block illustrated in FIG. 3 can be realized by the CPU, the GPU, the memory such as RAM, and various circuits; in terms of software, each block can be realized by programs loaded from recording media or the like into the memory, these programs providing a data input function, a data holding function, an image analysis function, a drawing function, and so on. Therefore, that these functional blocks can be realized in various ways by hardware alone, software alone, or combinations thereof can be understood by those skilled in the art and therefore the realization is not restricted to any particular form.

The imaging apparatus 12 includes a first camera 13a and a second camera 13b. Each of these cameras images an object from a horizontal position having a known interval at a predetermined frame rate. A stereo image obtained by the imaging is transmitted to the information processing apparatus 10 from time to time by a general technique upon demand by the information processing apparatus 10.

The information processing apparatus 10 includes an image acquisition block 42 acquiring data such as stereo images from the imaging apparatus 12, an input information acquisition block 44 acquiring instruction inputs from a user, a positional information generation block 46 generating positional information of an object on the basis of a taken image, an output information generation block 50 executing necessary processing on the basis of the position of an object so as to generate output information, and an image data storage block 48 storing data of stereo images acquired from the imaging apparatus 12 and intermediate data generated by the positional information generation block 46.

The input information acquisition block 44 accepts such instruction inputs from a user through means other than the imaging apparatus 12 as processing start and end requests, menu selection, and user operations for a game being played and transmits corresponding processing request signals to other functional blocks. The input information acquisition block 44 interprets the contents of operations done through general input apparatuses such as a button, a keyboard, a mouse, a track ball, and a touch panel and an input apparatus concerned so as to generate processing request signals in cooperation with the CPU 22.

The image acquisition block 42 acquires the data of a stereo image and so on from the imaging apparatus 12 in accordance with a request from the input information acquisition block 44 and stores the acquired data into the image data storage block 48. The data to be acquired may be various in accordance with the contents of the information processing that is executed by the information processing apparatus 10. For example, only an image taken by the first camera 13a may be acquired at a frame rate of imaging and a stereo image taken by the first camera 13a or the second camera 13b may be acquired at a rate or a frequency lower than that frame rate. That is, the acquisition rates of an image taken by the first camera 13a and an image taken by the second camera 13b may be set independently of each other. The image acquisition block 42 is realized by cooperative operations with the input block 38, the input/output interface 28, and the CPU 22 illustrated in FIG. 2.

The positional information generation block 46 is realized by the CPU 22, the GPU 24 and so on illustrated in FIG. 2 and, on the basis of the data of a stereo image stored in the image data storage block 48, generates the information on the position of an object in a three-dimensional space. The positional information generation block 46 includes a first positional information acquisition block 52 and a second positional information acquisition block 56. In the present embodiment, positional information generation processing is divided into the first processing that is executed by the first positional information acquisition block 52 and the second processing that is executed by the second positional information acquisition block 56 so as to enhance the accuracy of positional information and the speed of the processing. At this time, there are cases in which the first processing is used as the preprocessing to the second processing and both the first processing and the second processing are executed in parallel.

If the first processing is used as the preprocessing to the second processing, the first positional information acquisition block 52 identifies an approximate position of an object by predetermined means and the second positional information acquisition block 56 acquires the detail positional information by narrowing down the object on the basis of this approximate position. In this case, the second positional information acquisition block 56 acquires the positional information by a stereo image technique but the means used by the first positional information acquisition block 52 for identifying an approximate position may be various. In the processing based on a stereo image technique, the second positional information acquisition block 56 restricts a search range of a corresponding point in a stereo image on the basis of a range in which the existence of an object to be focused is estimated.

On the other hand, in the case where the first processing and the second processing are executed in parallel, the first positional information acquisition block 52 and the second positional information acquisition block 56 acquire the positional information by focusing on the objects assigned to these blocks. In this case, both the first positional information acquisition block 52 and the second positional information acquisition block 56 acquire the positional information on the basis of a stereo image technique. Then, on the basis of ranges in which the existence of objects to be focused is estimated, both the blocks restrict the search ranges of corresponding points in a stereo image. It should be noted that, in some cases, the second positional information acquisition block 56 integrates the positional information generated by the first processing with the positional information generated by the second processing so as to generate final positional information.

The output information generation block 50 is realized by the CPU 22, the GPU 24, and so on illustrated in FIG. 2 and, on the basis of the positional information of an object generated by the positional information generation block 46, appropriately executes the processing according to the purpose of use, such as executing further drawing processing on a taken image read from the image data storage block 48. As described above, the processing to be execute here is not especially restricted; for example, the processing may be switched appropriately in accordance with instructions from a user accepted by the input information acquisition block 44 or programs to be executed. The data of an image obtained as a result of the processing is outputted to the display apparatus 16 to be displayed. Alternatively, the data may be transmitted to another apparatus through a network. In addition, the output information generation block 50 may generate audio data corresponding to a motion of an object and output the generated audio data from a speaker.

Figure 4:
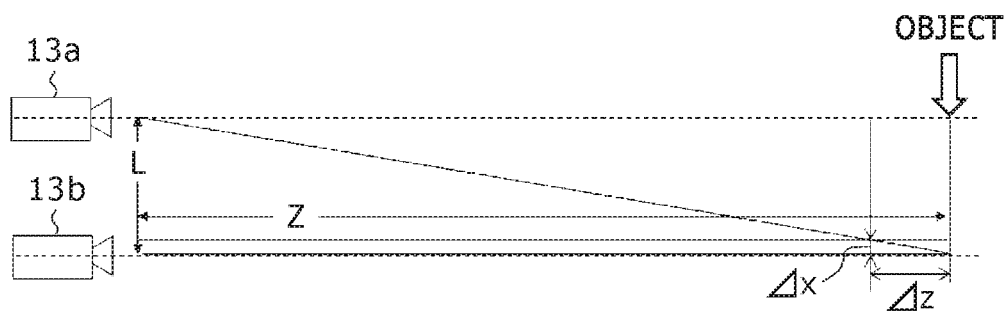
FIG. 4 is a diagram for describing a relation between a parallax in a stereo image and a position of an object in a depth direction.

The following describes a basic stereo matching technique that is executed by the second positional information acquisition block 56. Referring to FIG. 4, there is illustrated a diagram for describing a relation between a parallax in a stereo image and a position in the depth direction of an object. The first camera 13a and the second camera 13b are arranged so as to have parallel optical axes separated from each other by distance L. Relative to these cameras, an object is assumed to be positioned as indicated by a right-end arrow mark separated from the cameras by distance Z in the depth direction.

Width Δx in a real space represented by one pixel of an image taken by each camera is proportional to distance Z and expressed as follows:

$$\Delta x = Z \times w / W$$

where W denotes the number of pixels in the horizontal direction of the camera and w denotes a visual field range in the horizontal direction of a real space when distance Z is a unit length and is determined by visual angle. A same object taken by cameras separated from each other by distance L has approximate parallax D on the number of pixels on that image as follows:

$$D = L / \Delta x = L \times (W/w) \times (1/Z) = C/Z$$

where C is a value determined by a camera and the settings thereof and can be regarded as a constant at the time of operation.

Figure 5:
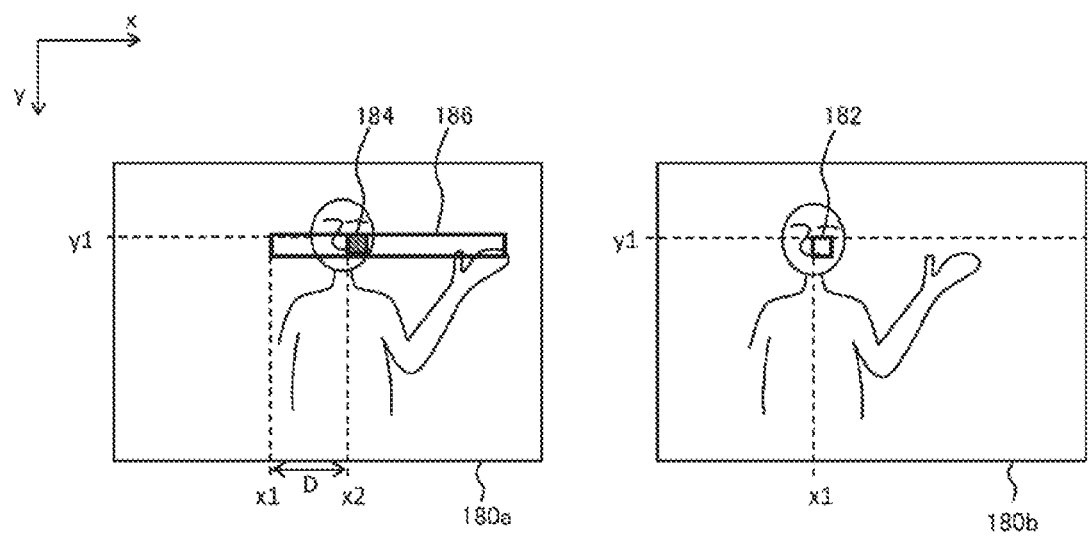
FIG. 5 depicts diagrams for describing a basic block matching technique used in the present embodiment.

If an offset between the figures of the same objects appearing on a stereo image is obtained as parallax D, then distance Z in the depth direction can be obtained from the relational expression mentioned above. In order to obtain parallax D, block matching is executed on a stereo image to identify a positional relation between the figures of the objects in both the images. Referring to FIG. 5, there is illustrated a diagram for describing a basic block matching technique. First, of a left viewpoint image 180a and a right viewpoint image 180b that constitute a stereo image, a reference block 182 having a predetermined size is set to the right viewpoint image 180b, for example.

The size of the reference block 182 is 4×4 pixels or 8×8 pixels, for example. Since parallax D can be obtained in units of reference block, the resolution of positional information in a depth direction is ¼×¼ times the original image in the case of 4×4 pixels and ⅛×⅛ times the original image in the case of 8×8 pixels. Next, in the left viewpoint image 180a, a block 184 that is high in similarity with the reference block 182 of the right viewpoint image 180b is identified.

Let the horizontal direction of an image be x axis and the vertical direction be y axis, then the identification of the highly similar block 184 requires to set, first for the left viewpoint image 180a, a search range 186 having a predetermined horizontal length to position y=y1 the same as the reference block 182 in the y-axis direction. Considering that the figure in the left viewpoint image 180a is shifted by parallax to the right side of the figure of the same object of the right viewpoint image 180b, the search range 186 is set to the right side from the start point of a horizontal position x1 of the reference block 182.

Next, by shifting a block frame having a same size as that of the reference block 182 in the horizontal direction in the search range 186, the similarity degree between an area (hereinafter referred to as a "target block") enclosed by the block frame and the reference block 182 is computed. The block frame is shifted by one pixel or by the predetermined two or more pixels. As a result, a variation in the similarity degree relative to the horizontal axis of the search range 186 is obtained. A target block at the time when the highest similarity degree has been obtained is a block 184 corresponding to the reference block 182. Then, a difference between the horizontal position x1 of the reference block 182 in the right viewpoint image 180b and a horizontal position x2 of the corresponding block 184 in the left viewpoint image 180a is parallax D.

By repeating the processing of obtaining parallax D as described above so as to obtain distance Z in the depth direction from the relational expression illustrated above with each area obtained by mesh-dividing the image plane of the right viewpoint image 180b as the reference block, distance Z is related with the positional coordinates in units of the reference block of the right viewpoint image 180b. It should be noted that, for the computation of a similarity degree, such techniques are proposed as SSD (Sum of Squared Difference), SAD (Sum of Absolute Difference), NCC (Normalized Cross-Correlation), ZNCC (Zero-mean Normalized Cross-Correlation), and others. Basically, any of these techniques are based on the comparison between a reference block and a target block on the basis of the luminance values of corresponding pixels.

Thus, in the case where positional information is obtained by a stereo image technique, as the resolution of a stereo image increases, a variation in the similarity degree for the position of a target block can be obtained in detail and with high accuracy, resulting in the enhancement in the accuracy of acquiring corresponding points and eventually distance Z in the depth direction. At the same time, however, the load of the matching processing on one reference block increases and the number of reference blocks increases, thereby increasing the time required for obtaining the position of an object for the entire area of an image.

If the number of horizontal pixels of the search range 186 is fixed regardless of the resolution of an image, then, as the resolution gets higher, an area over which the search range 186 extends gets narrower on the image, thereby possibly preventing the target block from getting to a true corresponding position. Therefore, in the present embodiment, by narrowing down the object in focus, the search range is set by restricting the search range to a proper position as described above, thereby generating positional information with high accuracy with less processing loads. The following describes an influence to positional information to be given when the search range is restricted.

Referring to FIG. 6, a result of obtaining positional information is represented by a depth image, the result being given when the setting positions of a restricted search range are made different. A depth image is an image with distance Z in the depth direction of an object obtained by a stereo image technique represented as a luminance distribution on the image plane. In FIG. 6, as distance Z gets greater, it is represented by lower luminance. In the top of depth images (a) and (b), the reference block 182 set to the right viewpoint image 180b and the search range 186 to be accordingly set to the left viewpoint image 180a are illustrated in the same form as illustrated in FIG. 5. This example is based on a taken image with a person in a room centered and includes a ceiling and surrounding objects within the visual field.

As illustrated, the depth image (a) is a depth image obtained when start point xa of the search range 186 is the same position x1 as a reference block. The depth image (b) is a depth image obtained by separating start point xb of the search range 186 by several tens of pixels from the position of reference block x1. It is assumed that the lengths of the search ranges of both the images be equal to each other. In the images, when attention is paid to personal face areas 190*a* and 190*b* shown up approximately at the centers, the depth image (a) has data defects more than those of the depth image (b).

On the other hand, when border lines 192*a* and 192*b* of a ceiling plate extending into the depths of the images are focused, the luminance of the border line is lower than that of the face area 190*a* in the depth image (a), namely, the border line is correctly depicted present deeper than the face, while, in the depth image (b), the border line has the same luminance as that of the face area 190*b*, namely, is erroneously recognized that the border line is at the same position as the face area in the depth direction. Since parallax D is inversely proportional to distance Z in the depth direction as described above, parallax D is greater for an object nearer to the user and therefore the corresponding points tend to go away from the reference block 182.

Consequently, as with the depth image (a), if the search range 186 is put in the proximity of the reference block 182, the correct positional information can be obtained relative to the object in the back. On the other hand, as with the depth image (b), as the search range 186 is put further away from the reference block 182, the correction information can be obtained for the object nearer to the user. Especially, for a line or a pattern such as boarder lines of a ceiling plate that repetitively appears on an image, error distance values may be computed because another line or pattern is erroneously recognized as a corresponding position as a result of the acquisition of a good similarity degree inside a limited search range although a true corresponding position at which a maximum similarity degree can be obtained exists otherwise.

With the depth image (b), the above-mentioned phenomena are given as a result. Taking these factors into consideration, in the present embodiment, the first positional information acquisition block 52 separately obtains an approximate position of an object and, on the basis of the obtained position, the second positional information acquisition block 56 executes block matching after setting a proper search range. Setting a search range such that a true corresponding position is included allows the acquisition of the correct positional information even if the search range itself is narrow.

Instead of restricting a search range, the block matching itself based on a restricted search range is executed in detail and with high accuracy. To be more specific, the processing to be executed by the second positional information acquisition block 56 is at least one of (1) using an image of high resolution; (2) using a sophisticated algorithm for the computation of a similarity degree; and (3) being executed with a high frequency compared to those executed by the first positional information acquisition block 52. Thus, making the second positional information acquisition block 56 provide the high quality processing also may allow the simplification of the processing to be executed by the first positional information acquisition block 52.

Figure 7:
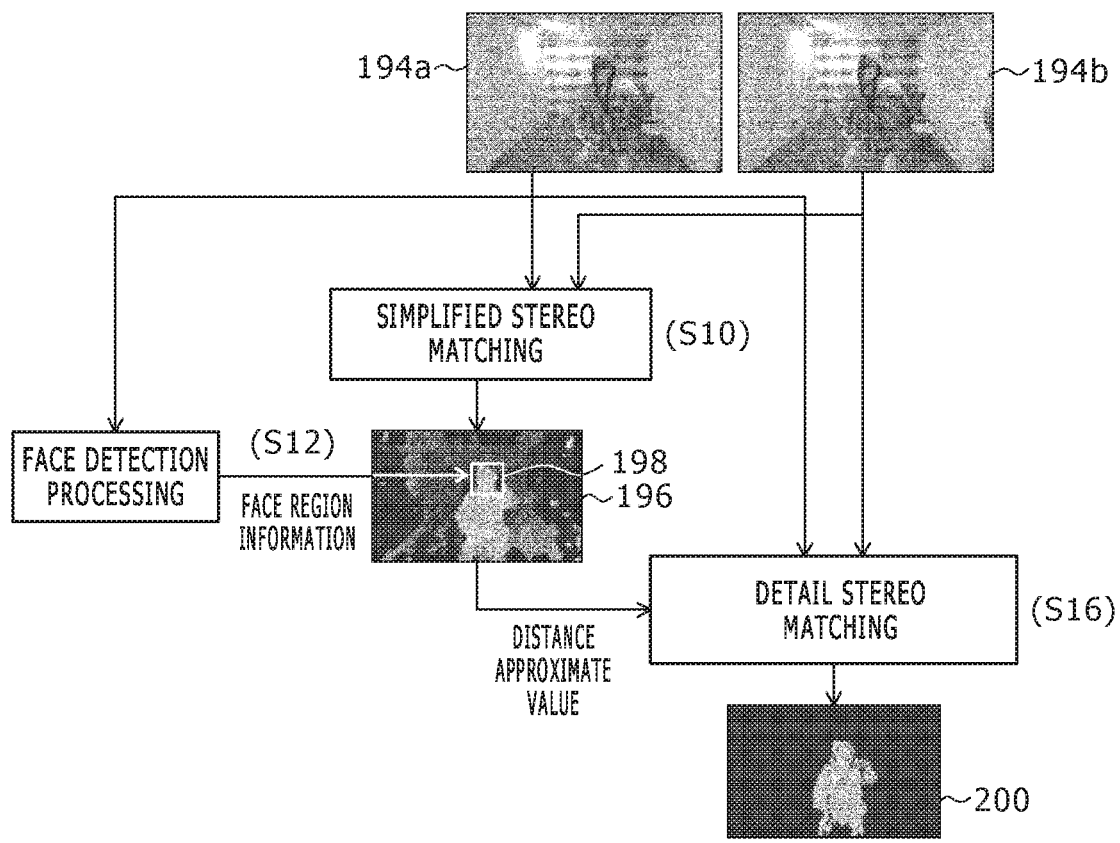
FIG. 7 is a diagram illustrating a flow of processing to be executed when a first positional information acquisition block executes simplified stereo matching and face detection processing and a second positional information acquisition block executes detail stereo matching in the present embodiment.

The following describes a flow of the positional information generation processing to be executed by the positional information generation block 46 that includes a variation of the processing to be executed by the first positional information acquisition block 52. Referring to FIG. 7, there is indicated a flow of processing to be executed when the first positional information acquisition block 52 executes simplified stereo matching and face detection processing and the second positional information acquisition block 56 executes detail stereo matching. In what follows, the processing in which corresponding positions on a stereo image are detected by the block matching as described above and, on the basis of an obtained parallax, a distance in the depth direction is obtained is also referred to as stereo matching. Further, in the following description, a user in front of the imaging apparatus 12 in a room is a main object of the acquisition of positional information; however, this does not restrict the objects and the imaging environment.

First, reading the data of stereo images 194*a* and 194*b* acquired by the image acquisition block 42 from the image data storage block 48, the first positional information acquisition block 52 executes simplified stereo matching by use of these stereo images (S10). The simplified stereo matching is basically the processing for generating a depth image by executing stereo matching in substantially the same procedure as that described above. However, by generating the images of low resolution by reducing the stereo images 194*a* and 194*b* acquired from the imaging apparatus 12, block matching is executed with the stereo images having a lower resolution than that used by the second positional information acquisition block 56.

Alternatively, the block size at the time of block matching may be increased. It should be noted that, if the imaging apparatus 12 has a function of outputting the stereo images having two or more resolutions, then the first positional information acquisition block 52 may use the stereo images of low resolutions generated by the imaging apparatus 12 as described above. It should also be noted that, as described above, the first positional information acquisition block 52 may simplify the similarity computation technique more than the technique used by the second positional information acquisition block 56 such as SAD. Here, term "simplified" satisfies at least one of these conditions: similarity computation time is short; the number of computation equations is small; and the number of parameters generated is small. SAD, simpler than other computation techniques, uses as a similarity degree the total sum of differences of the values of the pixels corresponding to each other in a reference block and a target block.

Also, the first positional information acquisition block 52 may execute stereo matching at a lower frequency than that in the second positional information acquisition block 56. On the other hand, the first positional information acquisition block 52 does not restrict the search range at the time of block matching. That is, the search range is wider than that of the second positional information acquisition block 56; that is, from the start point that is the reference block to the end of the image in a direction in which a parallax is caused. Consequently, a simplified depth image 196 is obtained indicative of a distance in the depth direction of all objects within a visual field independently of positions. At the same time, the first positional information acquisition block 52 executes face detection processing on either the stereo image 194*a* or 194*b* (S12). For the face detection processing to be executed here, a general technology such as template matching may be used that compares a template image indicative of an average face image or a registered face image with a taken image.

It should be noted that, if the frequency of the processing of the simplified stereo matching is reduced, the frequency of the face detection processing may be reduced accordingly.

In addition, if an object is not a person, the figure of the object can be detected by executing matching with a template image indicative of the shape and feature point of the object concerned instead of face detection. Then, the first positional information acquisition block 52 matches a face area 198 on the image obtained by the face detection processing with the simplified depth image 196 so as to obtain an approximate value of the distance in the depth direction of the user including the face. Here, the approximate distance value denotes an average value, for example, of a pixel value of a pixel at the center of the face area 198 or a pixel value constituting the area of a face regarded as existing at the same position in the face area 198.

If there are two or more users, two or more face areas are detected, so that an approximate distance value is obtained for each user. Next, the second positional information acquisition block 56 restrictively sets a search range on the basis of the approximate distance value concerned, thereby executing detail stereo matching (S16). Here, as described above, the stereo images 194a and 194b having a higher resolution than that used in the first positional information acquisition block 52 are used and the block size at the time of block matching is reduced. Alternatively, a similarity computation technique such as ZNCC is used that is more sophisticated than the technique used by the first positional information acquisition block 52 or the processing is executed at a higher frequency than that in the first positional information acquisition block 52.

In the simplified stereo matching in S10 and the detail stereo matching in S16, any one of the resolution of a stereo image, the complexity of a computation technique, and the frequency of the processing may be made different or two or more thereof may be made different at the same time. This differentiation may be appropriately determined in accordance with the balance between the accuracy of the positional information to be finally outputted and the overall processing load. Thus, the second positional information acquisition block 56 generates a depth image 200 that is detail and highly accurate at least for the user who is an object and outputs the generated depth image 200 to the output information generation block 50. Consequently, the output information generation block 50 is capable of correctly generating the output data such as a display image in accordance with the position and the motion of the user.

Figure 8:
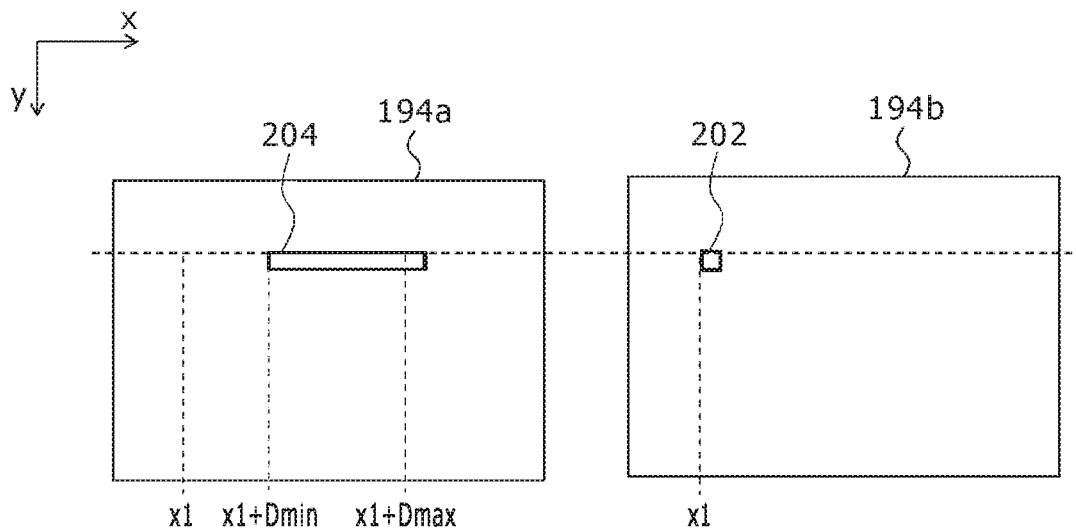
FIG. 8 depicts diagrams for describing a search range that is set by the second positional information acquisition block in the present embodiment.

Referring to FIG. 8, there is illustrated a diagram for describing a search range that is set by the second positional information acquisition block 56. First, let an approximate value of a distance in the depth direction of a user that is acquired by the first positional information acquisition block 52 be Ze. Then, considering an error of the approximate value and a thickness of the body, the second positional information acquisition block 56 determines estimated distance range $Ze-\Delta Zf \leq Z \leq Ze+\Delta Zb$ that includes a predetermined range before and after approximate value Ze. Here, $\Delta Zf$ is an allowance in the forward direction on the axis of distance Z and $\Delta Zb$ is an allowance in the back direction; for example, $\Delta Zf=\Delta Zb=30$ cm.

If the object is at the deepest in this range, then the parallax in the case of $Z=Ze+\Delta Zb$ appears the smallest, the parallax Dmin becoming
$Dmin=C/(Ze+\Delta Zb)$ from the equation described above. If the object is nearest up to the object, then the parallax in the case of $Z=Ze-\Delta Zf$ appears the largest, the parallax Dmax becoming
$Dmax=C/(Ze-\Delta Zf)$ from the equation described above.

Therefore, as illustrated in FIG. 8, a search range 204 to be set to a left viewpoint image 194a relative to a reference block 202 of the position x1 in a right viewpoint image 194b becomes a range of x1+Dmin to x1+Dmax as a travel amount of a target block. The second positional information acquisition block 56 provides a reference block that is each of areas obtained by mesh-dividing an image plane of the right viewpoint image 194b and computes a similarity degree by shifting the target blocks in the search range 204 set for each reference block. Then, a target block at the time when a high similarity degree has been obtained is detected as a block corresponding to the reference block concerned.

Consequently, for an object existing at least in a range of $Ze-\Delta Zf \leq Z \leq Ze+\Delta Zb$, the depth image 200 is obtained in which a distance in the depth direction is represented in detail and with high accuracy. Alternatively, the second positional information acquisition block 56 may further restrict the setting range of the reference block 202. That is, by setting the reference block 202 only to the area of the figure of the object, the block matching processing itself for surrounding objects is omitted. In this case, it is required to identify a range in which the figure of the object extends over the image.

For example, if an object is the user and the face area 198 detected in S12 is used as the reference, a movable ranges of fingers and toes can be easily estimated from the position and the size of the face area 198. Therefore, a maximum range over which the figure of the user extends so as to totally cover the movable ranges is determined and the reference block 202 is set within the determined maximum range. Alternatively, in the simplified depth image 196 obtained as a result of the simplified stereo matching in S10, an area of pixels continued from a face area and having a pixel value in a predetermined range may be estimated as an area of a human body from the value of pixels making up the face area 198 and set the reference block 202 by the restriction to that range.

Further, as an initial setting for a game or the like, a user posing as a figure such as fully extending the arms in a range over which the figure extends may be imaged so as to acquire the relation between the distance of the user in the depth direction at that moment and the maximum range concerned for each user. In this case, on the basis of an approximate value of the distance obtained by the first positional information acquisition block 52, the maximum range of the user is identified and the reference block 202 is set by the restriction to that range. These techniques allow the more efficient generation of the positional information of each object without making the fingers, for example, get out of a target of the detail stereo matching processing. It should be noted that the technique for restricting the reference block setting range can also be employed in the embodiment described below.

Figure 9:
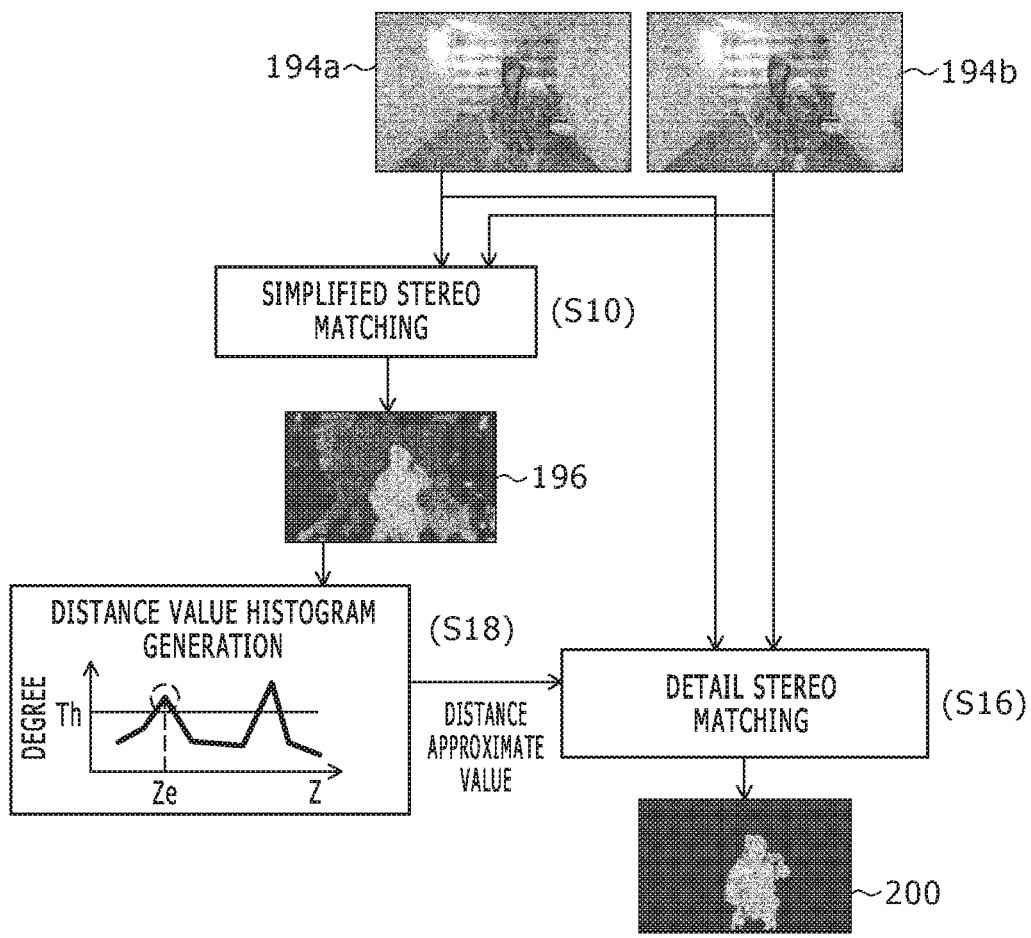
FIG. 9 is a diagram for describing a flow of processing to be executed when the first positional information acquisition block executes simplified stereo matching and histogram generation and the second positional information acquisition block executes detail stereo matching in the present embodiment.

Referring to FIG. 9, there is illustrated a diagram for describing, as another example of the flow of the processing executed by the positional information generation block 46, a flow of the processing to be executed when the first positional information acquisition block 52 executes the simplified stereo matching and histogram generation and the second positional information acquisition block 56 executes the detail stereo matching. It should be noted that the same processing as that illustrated in FIG. 7 is denoted by the same symbol and the description of the same processing will be skipped. In this example, the first positional information acquisition block 52 executes the simplified stereo matching (S10) and then generates a histogram of a distance value by use of the obtained simplified depth image 196 (S18).

That is, a histogram indicative of an occurrence degree of distance Z in the image in the depth direction indicated by a pixel value of the simplified depth image 196 is generated. Considering that the surface of an object exists at approximately the same position, the number of pixels sizable to some degree expressive of the surface of an object in the simplified depth image 196 have the pixel values of generally the same degree as these pixels. Use of this characteristics allows the estimation that an object exists at a distance corresponding to a pixel value at which the occurrence degree is high in the histogram. In the example of this drawing, since the occurrence degree has two peaks, it is considered that an object exists at the distances corresponding to the peaks.

The first positional information acquisition block 52 compares preset threshold value Th with the histogram and extracts a portion having an occurrence degree higher than threshold value Th. Threshold value Th is determined beforehand by obtaining the number of pixels represented as a human figure from an actual taken image, for example, with an error put into consideration. Since the size of the figure depends on distances in the depth direction, threshold value Th may be varied by the positions in the depth direction in the histogram.

Then, from the extracted peaks, the position of a peak selected with predetermined rules or a range thereof is estimated as the position or the range of a user. For example, in a general situation in which a user is positioned in the immediate front of the imaging apparatus 12 and there are furniture or a wall therebehind, the nearest peak or the peak having the short distance Z is selected. However, the selection rules are not restricted to this; namely, the selection rules may be changed appropriately depending upon imaging environment and the number of users. For example, obtaining a histogram on the basis of an image with only a background imaged before starting a game can exclude a peak caused by this background at the time of operation. In this case, if there are two or more users, it can be recognized that two or more peaks other than the excluded peak represent the figure of each user.

When the peak caused by the figure of a user has been estimated in this manner, a distance giving that peak or a center value of a range of a distance giving the occurrence degree equal to or higher than threshold value Th, for example, is determined as approximate value Ze of the distance in the depth direction of the user. On the basis of the determined approximate value, the second positional information acquisition block 56 restricts a search range on the basis of an estimated distance range with a predetermined range included before and after in substantially the same manner as described with reference to FIG. 7 and then executes the detail stereo matching (S16). In this case, too, since the depth image 200 that is detail and accurate can be generated at least for the user who is an object, the second positional information acquisition block 56 outputs the obtained data to the output information generation block 50.

Figure 10:
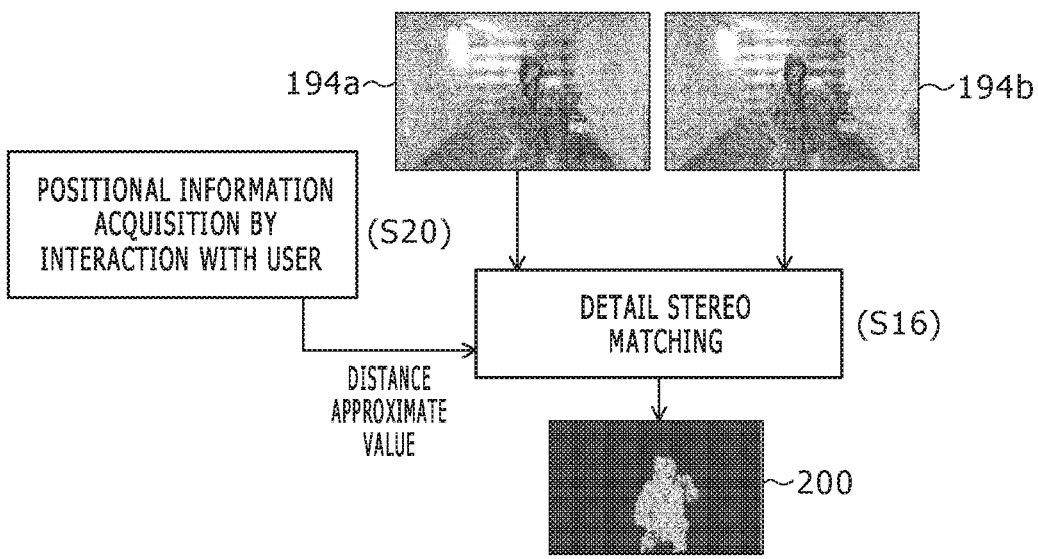
FIG. 10 is a diagram for describing a flow of processing to be executed when the first positional information acquisition block acquires an approximate value of distance by interaction with a user and the second positional information acquisition block executes detail stereo matching in the present embodiment.

Referring to FIG. 10, there is illustrated a diagram for describing, as another example of the flow of the processing executed by the positional information generation block 46, a flow of the processing to be executed when the first positional information acquisition block 52 acquires an approximate value of a distance by interaction with a user and the second positional information acquisition block 56 executes the detail stereo matching. It should be noted that the same processing as that illustrated in FIG. 7 is denoted by the same symbol and the description of the same processing will be skipped. In this example, by issuing an instruction such as "stand at a position approximately one meter from the camera," the first positional information acquisition block 52 prompts a user to stand at a predetermined position with a distance in the depth direction known. Alternatively, the first positional information acquisition block 52 guides a user in a game or the like so that the user naturally moves to a predetermined position. When the user stands at that predetermined position, the distance in the depth direction is given as "approximate value of distance" in the embodiment described so far.

In the case of a game that is played by users sitting on chairs, for example, the user may enter the distance from the imaging apparatus 12 in a sitting state. Since the distance required here may be an approximate value, the user may select from two or more candidate distances of predetermined intervals such as 30 cm, for example. The first positional information acquisition block 52 requests the output information generation block 50 for expressing in image or sound an instruction for user's standing position and an instruction for user's distance input instruction. Then, if a standing position is instructed, the first positional information acquisition block 52 determines a point of time at which the user moves to that position and stands still there and notifies the second positional information acquisition block 56 of the determined point of time.

If a distance is entered by the user, the first positional information acquisition block 52 acquires the entered information from the input information acquisition block 44 and notifies the second positional information acquisition block 56 of the acquired information. Using the stereo images 194*a* and 194*b* imaged at that point of time, the second positional information acquisition block 56 restricts a search range on the basis of an estimated distance range including a predetermined range before and after a specified or entered approximate value of the distance in substantially the same manner as the embodiment described so far, thereby executing the detail stereo matching (S16). In this case, too, since the depth image 200 that is detail and accurate can be generated at least for the user who is an object, the second positional information acquisition block 56 outputs the obtained data to the output information generation block 50.

It should be noted that, in the present embodiment, a timing with which the first positional information acquisition block 52 acquires an approximate value of the distance is limited to the start time of a game, for example. Therefore, once an approximate value of the distance concerned has been acquired so as to execute the detail stereo matching, the second positional information acquisition block 56 may use the positional information obtained by itself for the preceding frame so as to acquire the positional information of the subsequent frame.

Figure 11:
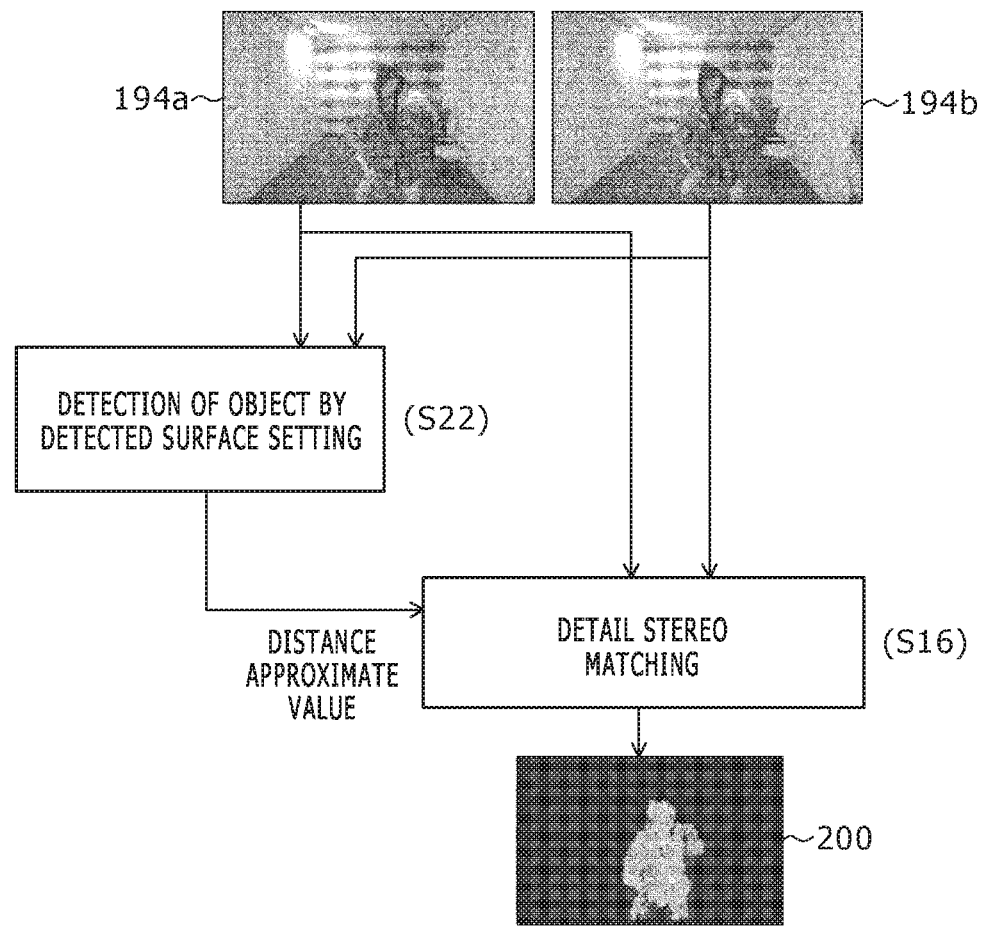
FIG. 11 is a diagram for describing a flow of processing to be executed when the first positional information acquisition block detects an object at a predetermined position by setting a detection surface and the second positional information acquisition block executes detail stereo matching in the present embodiment.

Referring to FIG. 11, there is illustrated a diagram for describing, as another example of the flow of the processing by the positional information generation block 46, a flow of the processing to be executed when the first positional information acquisition block 52 detects an object at a predetermined position by setting a detection surface and the second positional information acquisition block 56 executes the detail stereo matching. It should be noted that the same processing as that illustrated in FIG. 7 is denoted by the same symbol and the description of the same processing will be skipped. A technique for detecting the position of an object by use of a detection surface is disclosed in JP 2013-242812A.

In this technology, a detection surface is a surface that is virtually set in a real space. An area obtained by projecting a detection surface to the screen coordinates of the stereo images has a parallax corresponding to a distance from the imaging apparatus 12 to the detection surface. Assume that a person be standing at a position overlapping the detection surface, then the figure of this person in the stereo images must appear at a same position in the two areas made by projecting the detection surface to the stereo images. Therefore, from one of the stereo images, the area made by the projection of the detection surface is cut out and, from the other stereo image, the corresponding area determined by adding the parallax is cut out, thereby providing matching between the cut-out areas. If the figure is determined to be at the same position in the two areas, it can be recognized that the object concerned is present at the position of the detection surface. Details thereof will be described later.

The first positional information acquisition block 52 virtually sets such a detection surface at a predetermined position in a real space and executes matching between the areas made by the projection of the detection surface to the stereo images. As a result, if the pixels that are high in matching evaluation value have been detected more than the predetermined number of pixels, it is determined that a user exists at the position of the detection surface concerned. An approximate value of the distance in the depth direction of the user who is an object can be determined by setting detection surfaces to two or more positions, at predetermined intervals in parallel to the imaging surface of the imaging apparatus 12 for example, and executing the same determination processing as above for each detection surface.

In generally the same manner as the embodiment described so far, the second positional information acquisition block 56 restricts a search range on the basis of an estimated distance range including a predetermined range before and after the approximate value concerned, thereby executing the detail stereo matching (S16). In this case, too, since the depth image 200 that is detail and accurate can be generated at least for the user who is an object, the second positional information acquisition block 56 outputs the obtained data to the output information generation block 50.

Figure 12:
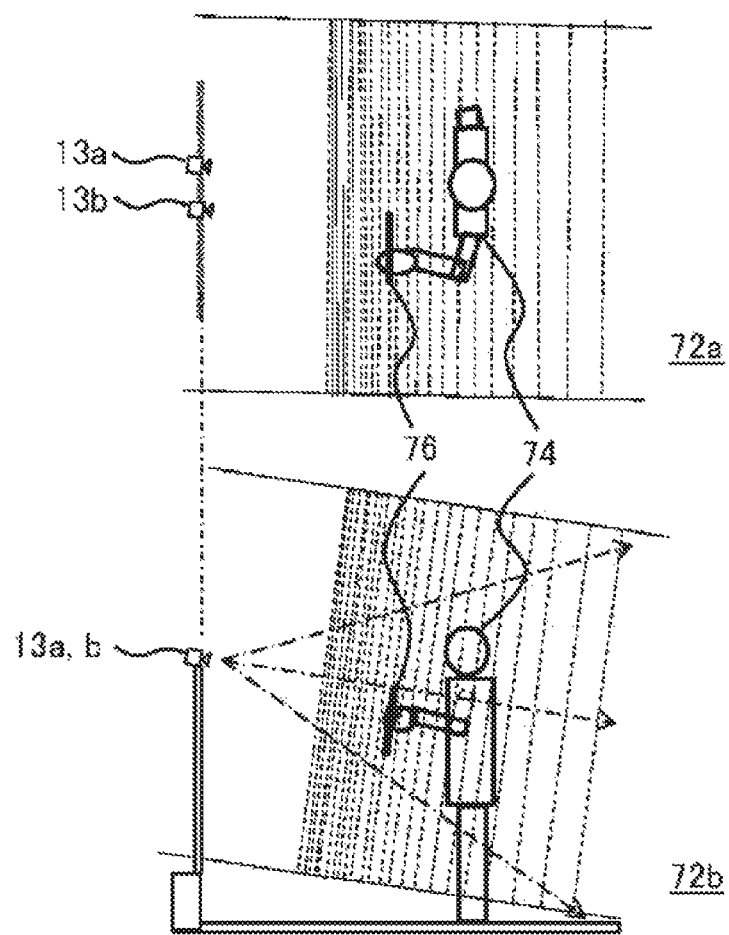
FIG. 12 depicts diagrams for describing a technique of detecting an object at a predetermined position by setting a detection surface in the present embodiment.

Referring to FIG. 12, there is illustrated a diagram for describing a technique of detecting an object at a predetermined position by setting a detection surface. The upper section of this diagram is a schematic diagram 72a with an imaging environment viewed from top and the lower section is a schematic diagram 72b viewed from side. As illustrated, a person 74 that is an object to be imaged is opposed to the first camera 13a and the second camera 13b. At this moment, a surface of equal parallax distributes as indicated with dashed lines. Here, a surface of equal parallax denotes a plane on which the parallaxes are equal at all points on the surface.

Figure 13:
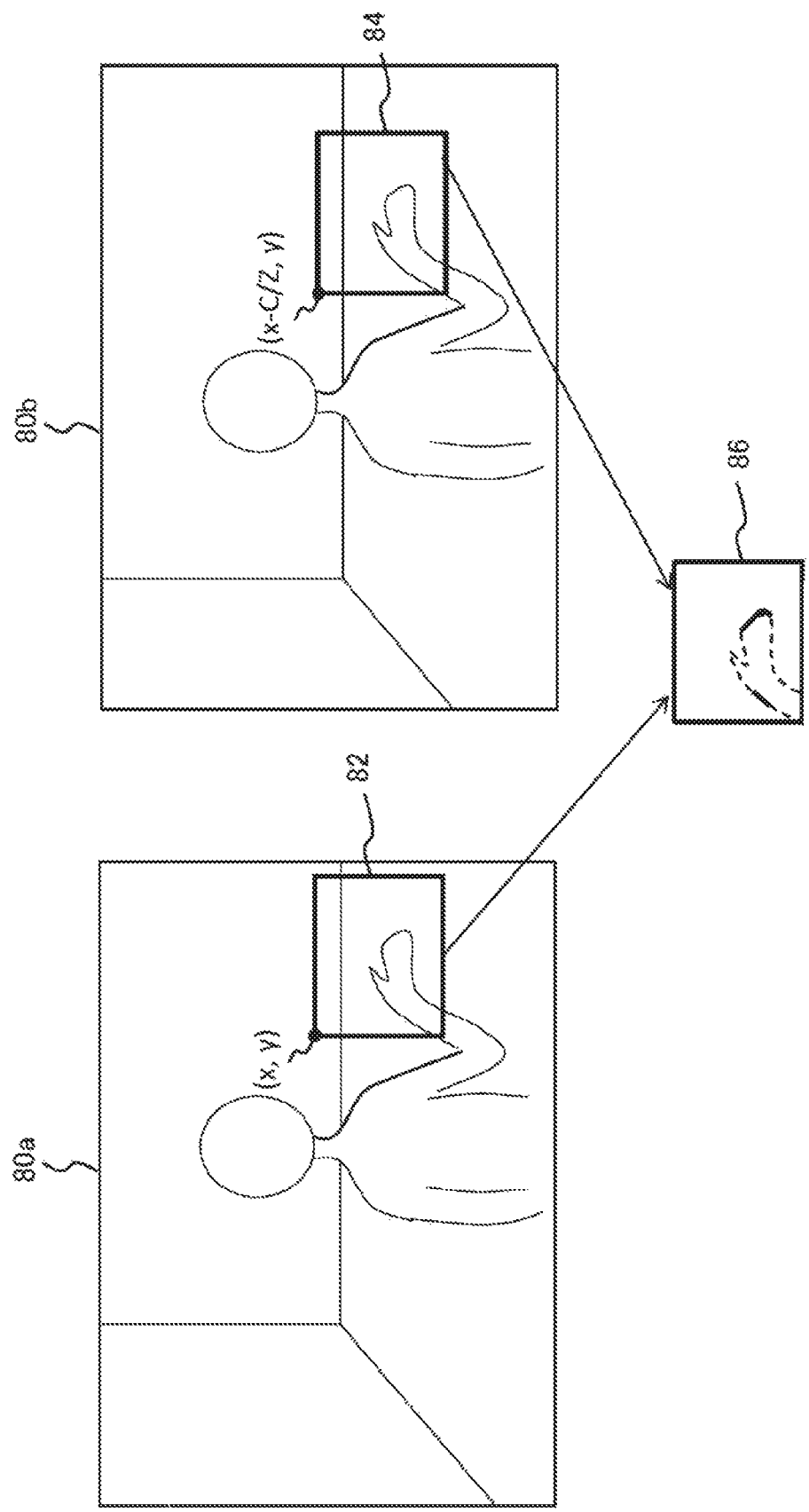
FIG. 13 depicts diagrams illustrating an example of a stereo image taken in an environment illustrated in FIG. 12.

In such an environment, a detection surface 76 is defined on a surface of equal parallax at a position to be detected. The detection surface 76 is a virtual plane with the vertex coordinate defined in a three-dimensional space based on a camera coordinate system. It should be noted that the shape of a contour of the detection surface is not especially restricted and the tilt thereof may be arbitrarily set. Referring to FIG. 13, there is illustrated an example of the stereo images taken in the environment illustrated in FIG. 12. An area 82 is obtained by projecting the detection surface 76 illustrated in FIG. 12 to a left viewpoint image 80a. In what follows, relative to "detection surface" defined in a three-dimensional space, an area obtained by projecting this detection surface to an image plane is referred to as "detection area."

It should be noted that the processing of projecting a model defined in a three-dimensional space to a two-dimensional image plane can be realized as general computer graphics processing. Let the coordinate at the upper left of the detection area 82 be (x, y). Then, if a detection surface is defined on a surface of equal parallax, the parallax between the left viewpoint image 80a and a right viewpoint image 80b is the same over all the area. That is, an object existing on the detection surface at distance Z in the depth direction is seen with an offset of parallax D=C/Z between the left viewpoint image 80a and the right viewpoint image 80b.

Therefore, let an area with the upper left coordinate being (x−C/Z, y) obtained by translating in the left direction the same area as the detection area 82 by the parallax be a parallax corrected area 84. That is, the parallax corrected area 84 is obtained by moving an area at the same position as the detection area 82 in the direction in which the parallax in the stereo images is resolved. Then, the feature point images of the detection area 82 of the left viewpoint image 80a and the parallax corrected area 84 of the right viewpoint image 80b, edge images, for example, are cut out to be matched. Then, a matching image 86 representing pixels high in an evaluation value is generated.

With the matching image 86 illustrated in FIG. 13, the entire contour of the left hand of the object extracted as an edge is indicated by solid lines or dashed lines for the ease of understanding, but the actual matching image is an image with only the portion indicated by solid lines left. That is, information is obtained that a part of the fingers and a part of the wrist are positioned on the detection surface illustrated in FIG. 12. The portions that are left as a matching image are determined by the decision of a matching evaluation threshold value. Adjusting this threshold value allows control of the detection resolution for distance Z in the depth direction.

It should be noted that if the detection surface is set so as to give a tilt to the surface of equal parallax, the parallax varies in the vertical direction of the image plane, so that determining the parallax corrected area by accordingly varying the offset amount of the detection area in the vertical direction results in the same subsequent processing. As described above, the first positional information acquisition block 52 determines that an object exists at the positon of the detection surface if the number of pixels high in a matching evaluation value is equal to or higher than a predetermined value in the matching image 86, and notifies the second positional information acquisition block 56 of that position as an approximate value of the distance.

It should be noted that, in the example illustrated, the detection surface has a size for detecting the position of a hand but the size of the detection surface is also varied depending on the size of an object, such as the entire body of a user. In addition, as described above, if two or more detection surfaces are set and the detection can be done in any one of these detection surfaces, an approximate value of the distance of an object can be obtained wherever the object is positioned.

In the embodiment illustrated in FIG. 7 and FIG. 8, the simplified stereo matching executed by the first positional information acquisition block 52 is intended to obtain an approximate value of the distance necessary for appropriately setting a restricted search range by the second positional information acquisition block 56. On the other hand, a simplified depth image consequently obtained may be included in the data of the positional information to be outputted from the positional information generation block 46. To be more specific, in the depth images acquired by the second positional information acquisition block 56, an area of the figure of an object with the distance obtained in detail and an area other than the figure of the object concerned among the simplified depth images acquired by the first positional information acquisition block 52 are composed into a final depth image.

That is, suppose a state in which, in one depth image, two or more areas indicative of pieces of depth information that are different in detail degree and accuracy exist together. Then, also for an area other than an area of an object such as a user, the depth information more accurate than that of the case in which a search range is restricted is obtained. For example, if AR in which an object model drawn on a taken image is moved in accordance with the motion of a user is realized, the positional recognition accuracy to be obtained differs between an interaction with the user and an interaction with surrounding objects. That is, since a human body such as user's hand is complicated in shape and motion, the realization of interactions high in the sense of presence requires detail positional information.

Figure 14:
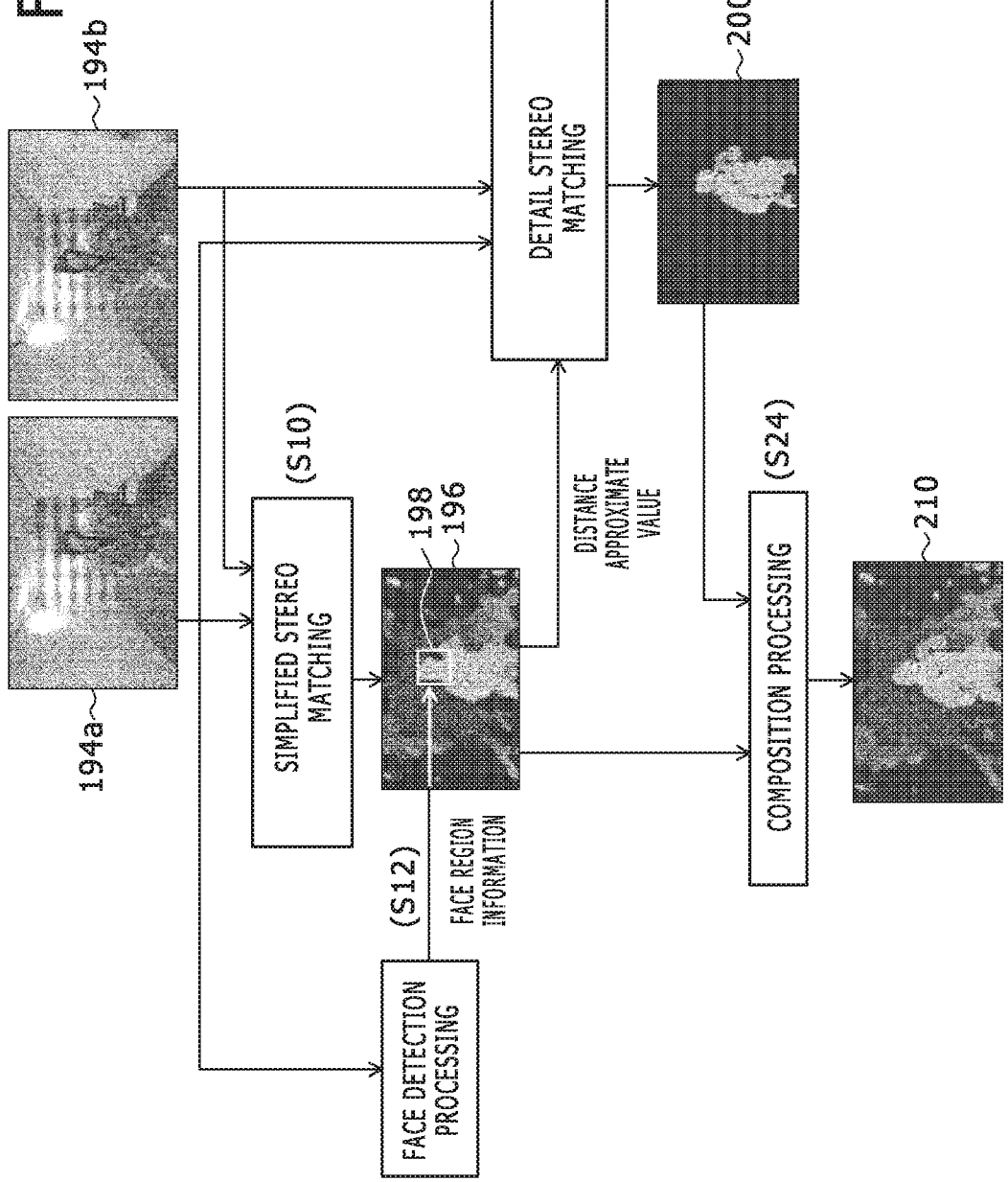
FIG. 14 is a diagram for describing a flow of processing to be executed by a positional information generation block in a mode where pieces of depth information having different degree of detail and accuracy are composed so as to generate one depth image in the present embodiment.

On the other hand, surrounding objects are generally simple in shape and seldom move, so that approximate positional information does not seriously impair the sense of presence. Therefore, giving variations to the detail degree and accuracy in one depth image as described above can prevent the processing load from getting large while providing necessary information. Referring to FIG. 14, there is illustrated a diagram for describing a flow of the processing to be executed by the positional information generation block 46 in a mode in which pieces of depth information that are different from each other in detail degree and accuracy are composed into one depth image. It should be noted that the same processing as that illustrated in FIG. 7 is denoted by the same symbol and the description of the same processing will be skipped. In this case, as described above with reference to FIG. 7, the first positional information acquisition block 52 executes the simplified stereo matching by use of the stereo images 194*a* and 194*b* (S10). At the same time, the first positional information acquisition block 52 executes face detection processing on either the stereo image 194*a* or 194*b* (S12).

Then, by applying the face area 198 to the simplified depth image 196 generated by the simplified stereo matching, an approximate value of the distance in the depth direction of the user including the face is obtained. On the basis of the obtained approximate value of the distance, the second positional information acquisition block 56 restricts a search area in generally the same manner as described with reference to FIG. 7, thereby executing the detail stereo matching (S16). Next, the second positional information acquisition block 56 composes the depth image 200 generated as described above that indicates detail and accurate positional information on the user who is an object and the simplified depth image generated by the simplified stereo matching executed in S10 by the first positional information acquisition block 52 (S24).

To be more specific, in the simplified depth image 196, a pixel value of the area of the figure of an object is replaced by a pixel value of the area corresponding to the depth image 200 obtained in detail by the second positional information acquisition block 56 for that object. If there is a difference in resolution (the size of an image) between the simplified depth image 196 generated by the first positional information acquisition block 52 and the depth image 200 generated by the second positional information acquisition block 56, the pixel values are replaced after enlarging the size of the former to the size of the latter, for example.

Consequently, in the depth image totally obtained in a wide search range by the first positional information acquisition block 52, a depth image 210 indicative of the depth information that is especially detail and accurate for the area of the figure of an object is generated. It should be noted that, since an area other than that of the object possibly includes furniture or a wall that are simple in shape or seldom moves, the frequency of updating the composed portion of the simplified depth image 196 may be lower than that of the composed portion of the detail depth image 200. For example, the frequency of updating of the former may be approximately $\frac{1}{10}$ of that of the latter. At this time, the frequency of the processing itself to be executed by the first positional information acquisition block 52 may be lowered.

The illustrated example depicts a mode in which the first positional information acquisition block 52 detects a face area as illustrated in FIG. 7; it is also practicable for the first positional information acquisition block 52 to detect an approximate value of a distance by use of a histogram as described with reference to FIG. 9. Further, as described with reference to FIG. 10 and FIG. 11, a mode of obtaining an approximate value of a distance may be combined through means other than stereo matching. In this case, the first positional information acquisition block 52 separately executes the simplified stereo matching so as to generate a simplified depth image to be composed.

Figure 15:
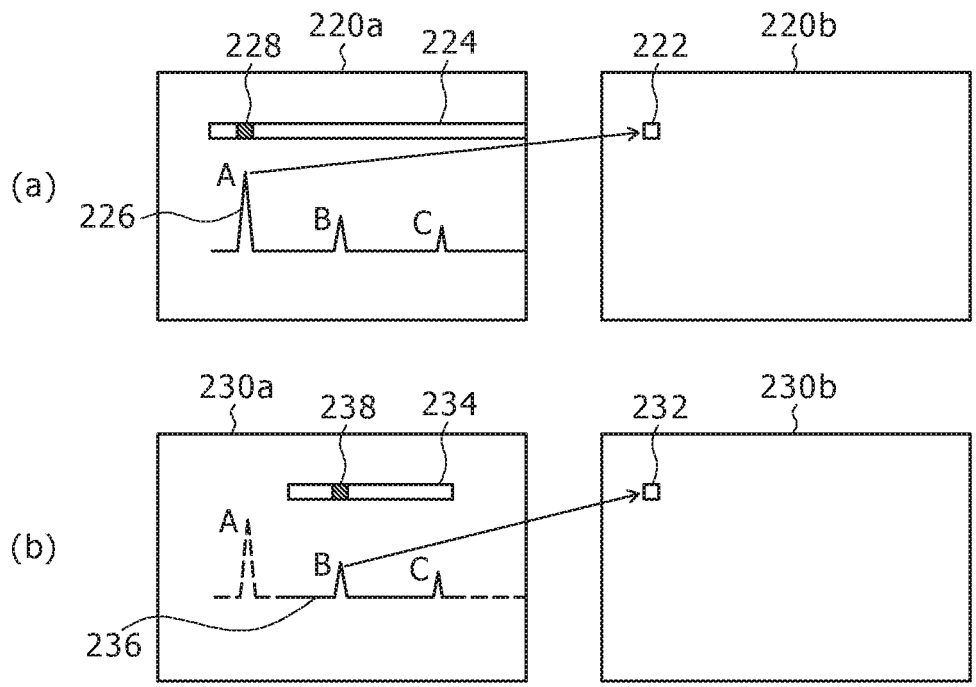
FIG. 15 depicts diagrams for describing a composition processing technique in the present embodiment.

Referring to FIG. 15, there are illustrated diagrams for describing a technique of the composition processing. In the composition processing, it is necessary to determine an area to be replaced by a depth image generated by the second positional information acquisition block 56 in the simplified depth image 196. The depth image generated by the second positional information acquisition block 56 is the data dedicated to the distance range of an object and any objects at the other positions are excluded from the distance computation target in principle. Restricting a search range as described above originally detects only the objects existing in a distance range corresponding to the search range by the degree of similarity in block matching; however, there is a possibility that similar objects such as lines and patterns that each appear as with the above-mentioned ceiling boundary lines are erroneously detected.

The upper diagram (a) of FIG. 15 illustrates a manner in which the first positional information acquisition block 52 executes block matching without restricting a search range. The lower diagram (b) illustrates a manner in which the second positional information acquisition block 56 executes block matching by restricting a search range. To be more specific, of stereo images 220*a* and 220*b* in (a), a search range 224 reaching the right end of the image is set to the left viewpoint image 220*a* relative to a reference block 222 of the right viewpoint image 220*b*. On the other hand, of stereo images 230*a* and 230*b* in (b), a restricted search range 234 is set to the left viewpoint image 230*a* relative to a reference block 232 of the right viewpoint image 230*b*.

It should be noted that the reference blocks 222 and 232 are assumed to be at the same position. Under each of the search ranges 224 and 234, similarity degrees 226 and 236 computed in these ranges are illustrated by way of example. However, in (b), a similarity degree is actually computed only in solid-line parts. If the wide search range 224 is set as with (a), a target block 228 that is obtained when maximum similarity degree A is obtained is detected as a corresponding block. However, if similar lines or patterns exist at other horizontal positions, different maximum points such as similarity degree B and similarity degree C. are also obtained as illustrated.

If a search range is restricted as illustrated in (b) in such an imaging environment as described above, regardless that a true corresponding position exists outside the search range 234 concerned, maximum similarity degree B is obtained in that search range at another position and a target block 238 at that time is detected as a corresponding block. As a result, a false parallax is obtained so that there is a possibility to compute out a false distance value. As with the example illustrated in (b), a detail depth image generated by the second positional information acquisition block 56 possibly includes erroneous positional information.

Therefore, by correctly determining an area to be replaced as described above, the final depth image 210 indicative of the positional information having less errors over the entire image is generated. Most simply, in a simplified depth image, an area having a pixel value equal (a predetermined range) to a pixel value in a face area and made up of pixels continued from the face area is replaced by a pixel value of the depth image generated by the second positional information acquisition block 56, as an area of the figure of a user who is an object.

If a histogram is used as described with reference to FIG. 9, of the pixels making up a peak at the time when an approximate value of a distance is obtained, the pixels continuously forming an area of a predetermined size are replaced by the pixel value of a depth image generated by the second positional information acquisition block 56. Alternatively, a comparison may be done between the similarity degree obtained at the time of generating a simplified depth image by the first positional information acquisition block 52 and the similarity degree obtained at the time of generating a detail depth image by the second positional information acquisition block 56, thereby executing replacement to the data of the detail depth image if the latter is higher than the former.

That is, in the processing of the simplified stereo matching, the first positional information acquisition block 52 generates beforehand a similarity degree image in which maximum similarity degree A obtained at the time of having detected the target block 228 as a corresponding block is related with the position of the corresponding reference block 222. Likewise, in the processing of the detail stereo matching, the second positional information acquisition block 56 also generates beforehand a similarity degree image in which maximum similarity degree B obtained at the time of having detected the target block 238 as a corresponding block is related with the position of the corresponding reference block 232. Then, in composing the depth images, a comparison is done between the similarity degrees corresponding to the reference blocks at the same position of both the similarity degree images so as to employ the data of the depth image having the higher similarity degree as a true distance value.

Since the example illustrated in FIG. 15 is A>B, the distance value obtained by the first positional information acquisition block 52 from (a) above is employed. It should be noted that, if the first positional information acquisition block 52 and the second positional information acquisition block 56 use different techniques for computing similarity degrees, it is possible that a simple comparison cannot be done because of the different scales of similarity degrees. If the relation between the values of both techniques is known beforehand, the scale conversion between both is accordingly executed before doing the comparison. Alternatively, as illustrated in (a) and (b) of FIG. 15, if the search ranges 224 and 234 are partially overlapped, a comparison may be done between the similarity degrees at the same position so as to obtain magnification by which one of the similarity degrees is multiplied, thereby justifying the scales.

Figure 16:
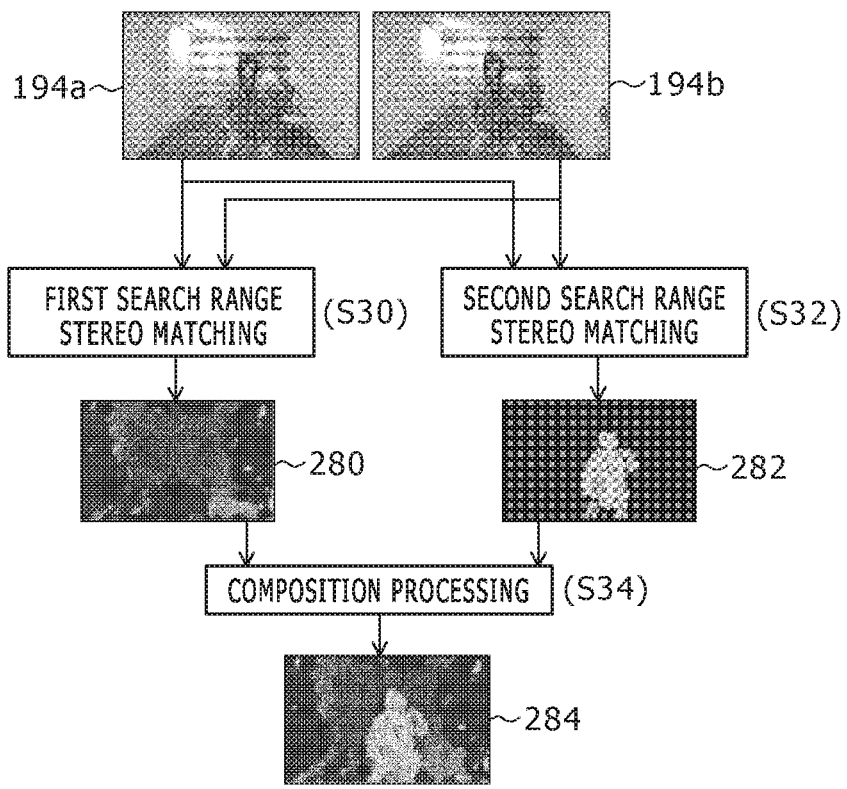
FIG. 16 is a diagram for describing a flow of processing by the positional information generation block in a mode where a distance computation object is shared in the present embodiment.

In the modes described so far, the first positional information acquisition block 52 executes stereo matching with coarse accuracy by setting a wide search range to stereo images as one technique of obtaining an approximate value of a distance of an object. For one variation to that technique, the first positional information acquisition block 52 may also restrict a search range, compute a distance value by targeting an object existing at a position different from that in the second positional information acquisition block 56 and compose the both pieces of positional information into a final depth image. Referring to FIG. 16, there is illustrated a diagram for describing a flow of the processing to be executed by the positional information generation block 46 in a mode in which targets of distance computation are dividedly shared as described above.

In this example, the first positional information acquisition block 52 obtains a distance by targeting a background such as furniture or a wall behind a user and the second positional information acquisition block 56 obtains a distance by targeting a foreground such as a user like the example described so far. Since the ranges of distances from the camera are obviously different between the background and the foreground, a search range to be set by the first positional information acquisition block 52 at the time of stereo matching and a search range to be set by the second positional information acquisition block 56 at the time of stereo matching are individually set in accordance with the distance ranges.

For example, in the former, a search range is from a start point that is the position of the reference block to the 63rd pixel; in the latter, a search range is from a start point that is the 64th pixel to the 127th pixel. It should be noted that each search range may be a fixed value as described above or, like the mode described so far, adaptively set in accordance with an approximate value of a distance of an object such as a user obtained by the first positional information acquisition block 52. The search range set by the first positional information acquisition block 52 is a first search range and the search range set by the second positional information acquisition block 56 is a second search range. The first search range and the second search range that are set for one reference block may have or may not have overlapping parts such as those in the example described above.

Next, the first positional information acquisition block 52 sets the first search range to the one image 194a in accordance with each reference block of the other image 194b of the stereo images, for example, thereby executing stereo matching (S30). As a result, a depth image 280 in which a correct distance is illustrated at least for an object in the background is obtained. On the other hand, the second positional information acquisition block 56 sets the second search range to the one image 194a in accordance with each reference block of the other image 194b of the stereo images, for example, thereby executing stereo matching (S32). As a result, a depth image 282 in which a correct distance is illustrated for an object in the foreground, namely, the user, is obtained.

Then, the second positional information acquisition block 56 composes both the depth images in substantially the same manner as described with reference to FIG. 14 (S34). To be more specific, in the depth image 280 generated by the first positional information acquisition block 52, an area in the foreground is replaced by the data of the depth image 282 generated by the second positional information acquisition block 56. As a result, a final depth image 284 with a correct distance expressed as a pixel value is generated in both the foreground and the background.

Figure 17:
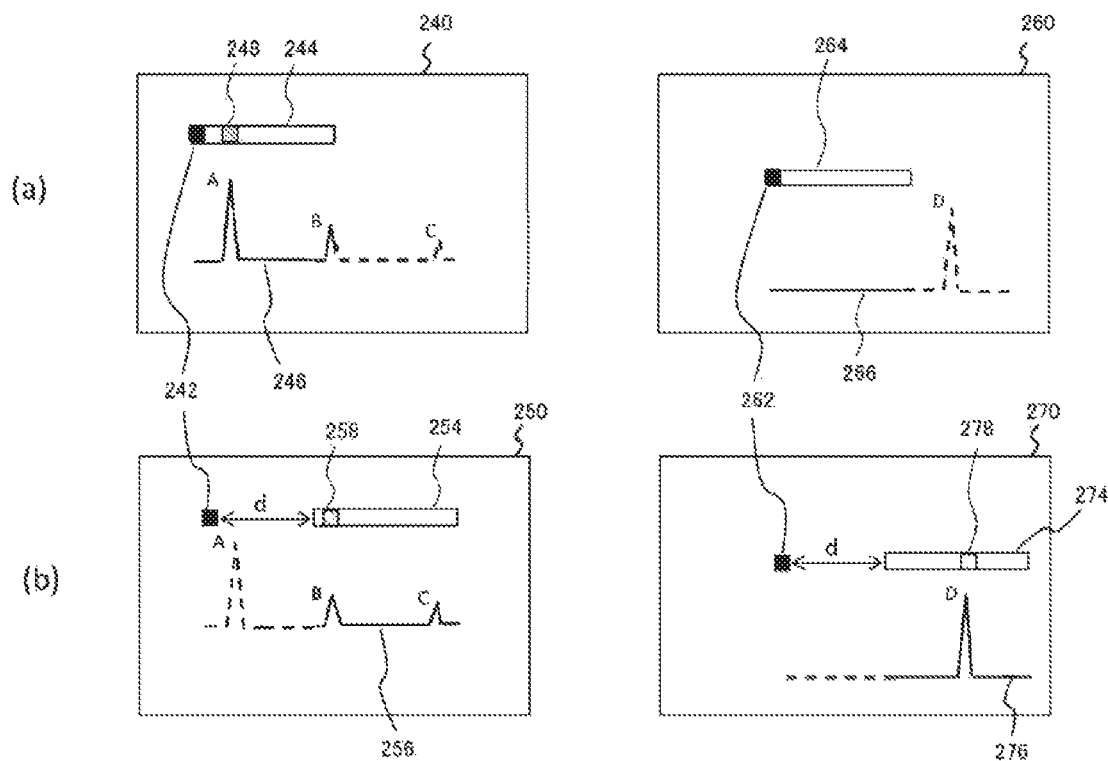
FIG. 17 depicts diagrams illustrating manners of block matching that are executed when targets of obtaining distances are dividedly shared between the first positional information acquisition block and the second positional information acquisition block in the present embodiment.

Referring to FIG. 17, there are illustrated diagrams illustrating manners of block matching that are executed when targets of obtaining distances are dividedly shared between the first positional information acquisition block 52 and the second positional information acquisition block 56. The upper diagram (a) of FIG. 17 illustrates a search range that is set by the first positional information acquisition block 52 in accordance with two reference blocks 242 and 262. On the other hand, the lower diagram (b) illustrates a search range that is set by the second positional information acquisition block 56 in accordance with the same reference blocks 242 and 262 as those in (a). The representation of the drawings is the same as that of FIG. 15. However, in FIG. 17, the position of each reference block is indicated by a black frame in the same image as the image to which a search range is set.

As illustrated in the example described above, if the first positional information acquisition block 52 obtains a background distance and the second positional information acquisition block 56 obtains a foreground distance, then the search range of the former is a search range that is near the reference block and the search range of the latter is a search range that is far from the reference block. For example, for the reference block 242 illustrated at the left side of FIG. 17, the first positional information acquisition block 52 sets a search range 244 in the proximity of the reference block 242 as with an image 240. The second positional information acquisition block 56 sets as described above a search range 254 at a position away from the reference block 242 by the predetermined number of pixels d as with an image 250. The setting of search ranges 264 and 274 for the reference block 262 illustrated at the right side of FIG. 17 is done in substantially the same manner.

First, in the case of the image 240, a target block 248 at the time when maximum similarity degree A is obtained in a similarity degree 246 obtained for the search range 244 by the first positional information acquisition block 52 is detected as a corresponding block. On the other hand, in the case of the image 250, a target block 258 at the time when maximum similarity degree B is obtained in a similarity degree 256 obtained for the search range 254 by the second positional information acquisition block 56 is detected as a corresponding block. In this case, at the time of composition processing, a value computed by the first positional information acquisition block 52 is employed as a distance value for the reference block 242 by executing a comparison between maximum similarity degrees A and B, for example, in substantially the same manner as described with reference to FIG. 15.

On the other hand, in the case of an image 260, a similarity degree 266 obtained for the search range 264 by the first positional information acquisition block 52 has no block in which the similarity degree is as prominent as being regarded as corresponding, so that no corresponding position is detected. In this case, the pixel value of a depth image is 0, for example. In contrast, in the case of an image 270, a target block 278 at the time when maximum similarity degree D is obtained in a similarity degree 276 obtained for the search range 274 by the second positional information acquisition block 56 is detected as a corresponding block. In this case, at the time of composition processing, a value computed by the second positional information acquisition block 56 is employed as a distance value for the reference block 262.

Thus, of the distance values illustrated in the two depth images generated by the first positional information acquisition block 52 and second positional information acquisition block 56, a value to be employed is appropriately selected for each reference block so as to determine a final pixel value for the entire image plane, thereby composing a depth image. As a result, the distances of all objects of different positions can be correctly obtained in substantially the same manner in which search is executed in a range that extends all over the restrictive search ranges set by these blocks.

Here, by dividedly sharing the targets for which distance values are obtained by the first positional information acquisition block 52 and the second positional information acquisition block 56, the detail degree and accuracy of the processing of both the blocks can be individually set as with the modes described so far. That is, as described above, it is assumed that the foreground be more complicated in shape and more frequent in motion than the background, so that, as compared to the first positional information acquisition block 52 that processes the background, the second positional information acquisition block 56 that processes the foreground executes at least one of the modes of using stereo images of high resolutions, employing sophisticated methods of similarity degree computation, and increasing the frequency of the processing.

It should be noted that, if the computation techniques are made different, the search ranges of the first positional information acquisition block 52 and the second positional information acquisition block 56 may partially be overlapped so as to make a comparison between similarity degrees at the same position as with the example of FIG. 15, thereby justifying the scales of both. Varying detail degrees and resolutions in accordance with the characteristics of each target allows the acquisition of necessary positional information with a required accuracy, while omitting wasted processing.

According to the embodiment described above, the processing is divided into two or more roles in an information processing apparatus configured to obtain the position of an object in a three-dimensional space by use of stereo images. To be more specific, only for a target for which an entire image or distance is to be obtained in detail, an approximate value of a distance in the depth direction is obtained and block matching is executed only on a search range corresponding to the obtained approximate value, thereby obtaining detail and accurate positional information. Consequently, the processing can be simplified for the objects such as the background other than the targets and, at the same time, the correct positional information can be obtained for the targets. As a result, the mitigation of processing load and the enhancement of the accuracy of positional information necessary for the subsequent processing steps can be both achieved at the same time.

Further, by composing overall and simplified positional information generated by dividing the processing into two steps with the detail positional information obtained by narrowing down a target, a depth image including areas having different detail degrees and accuracies is generated. Consequently, if required detail degrees and accuracies are different depending on the characteristics of targets, the matching positional information can be expressed by one depth image. As a result, the information necessary for the subsequent processing steps can be properly outputted with less processing load and data amount.

In addition, targets for which distances are computed by the approximate positions of the targets are dividedly shared and appropriate search ranges are set to the resultant targets so as to process the targets in parallel. Then, by composing the generated pieces of positional information into a final depth image that totally covers the necessary distance ranges. At this time, at least any one of a resolution, a similarity degree computation technique, and a processing frequency can be made different depending on the characteristics of targets so as to minimize the excessive processing and concentrate the processing to a necessary target. As a result, the positional information that is necessary for the subsequent processing steps and accurate can be properly outputted with less processing load and data amount.

While the present invention has been described in conjunction with a specific embodiment given as an example, it should be understood by those skilled in the art that the above-described composing elements and various processes may be combined in diverse ways and that such modifications also fall within the scope of the present invention.

REFERENCE SIGNS LIST

2 . . . Information processing system, 10 . . . Information processing apparatus, 12 . . . Imaging apparatus, 16 . . . Display apparatus, 13a . . . First camera, 13b . . . Second camera, 22 . . . CPU, 24 . . . GPU, 26 . . . Main memory, 42 . . . Image acquisition block, 44 . . . Input information acquisition block, 46 . . . Positional information generation block, 48 . . . Image data storage block, 50 . . . Output information generation block, 52 . . . First positional information acquisition block, 56 . . . Second positional information acquisition block

INDUSTRIAL APPLICABILITY

As described above, the present invention is applicable to a game machine, an image processing apparatus, an information processing apparatus, an object recognition apparatus, an image analysis apparatus and a system that includes any of these machine and apparatuses.

The invention claimed is:

1. An information processing apparatus comprising:
an image acquisition block configured to acquire data of stereo images with a same space taken by left and right cameras having a known interval there between; and
a positional information generation block configured to detect corresponding points by executing block matching on a reference block set to one of said stereo images for detecting an area having a high similarity degree within a search range set to the other of said stereo images, generate information of a position including a distance of a target from the camera on the basis of an obtained parallax, and output the generated information,
wherein said positional information generation block executes said block matching after once adjusting and determining a start position and a length of said search range on the basis of an approximate value of said position of an acquired target, thereby generating final information of said position of the same target,
wherein said positional information generation block includes a distance approximate value acquisition block configured to estimate a distance of a target so as to acquire said approximate value, and
wherein said distance approximate value acquisition block acquires a distance of an object to be imaged from the camera by executing block matching on said stereo images in a search range wider than a search range in generating information of said final position, generates a depth image with the acquired distance indicative of a pixel value on an image plane, and estimates a distance of said target by applying an area of a figure of the target detected from one of said stereo images.

2. The information processing apparatus according to claim 1, wherein said distance approximate value acquisition block acquires a distance of an object to be imaged from the camera by executing block matching on said stereo images in a search range wider than a search range in generating information of said final position, generates a depth image with the acquired distance indicative of a pixel value on an image plane, generates a histogram of a distance value on the basis of the depth image, and estimates a distance of said target on the basis of a distance having the number of pixels equal to or higher than a threshold value.

3. The information processing apparatus according to claim 1, wherein the block matching to be executed by said distance approximate value acquisition block, as compared with a block matching to be executed by adjusting a search range by use of a result of the former block matching, is at least one of using stereo images of low resolution, using a simple similarity degree computation technique, and executing processing at a low frequency.

4. The information processing apparatus according to claim 1, wherein, in a depth image generated by the block matching executed by said distance approximate value acquisition block, said positional information generation block replaces an area of said target by data of a depth image generated by executing block matching by adjusting a search range by use of a result of the generation, thereby generating final information of a position.

5. The information processing apparatus according to claim 4, wherein, at the time of the block matching executed by said distance approximate value acquisition block, said positional information generation block makes a comparison between a similarity degree with which a corresponding block is determined and a similarity degree with which a corresponding block is determined at the time of the block matching executed by adjusting a search range and, if the latter similarity degree is higher than the former, replaces the data of the depth image.

6. The information processing apparatus according to claim 1, wherein said distance approximate value acquisition block sets a detection area obtained by setting a virtual detection surface in a real space and projecting this detection surface to one of the stereo images and a parallax corrected area obtained by translating, in the other image, an area corresponding to said detection area in a direction of cancelling a parallax by an amount of parallax corresponding to a distance of said detection surface from the camera, executes matching between the images in said detection area and said parallax corrected area in the stereo images, and decides whether or not there is a target at a position of said detection surface on the basis of the number of pixels having a high matching evaluation value, thereby estimating a distance of said target on the basis of a result of this decision.

7. The information processing apparatus according to claim 1, wherein said distance approximate value acquisition block outputs, through a display apparatus or a speaker, an instruction for a user to move to a predetermined position with a known distance from the camera and decides a point of time when the user has moved to said predetermined position, thereby estimating a distance of said target.

8. The information processing apparatus according to claim 1, wherein said positional information generation block executes said block matching on a plurality of different approximate values of said positions by adjusting a search range to a corresponding position and a corresponding length, acquires a distance from the camera on the basis of detected corresponding points, generates a plurality of depth images with the acquired distance indicative of a pixel value on an image plane, and composes the generated plurality of images, thereby generating final information of said position.

9. The information processing apparatus according to claim 8, wherein said plurality of approximate values of positions correspond to positions of a foreground and a background and, as compared with block matching on a foreground, block matching on a background is at least one of using stereo images of low resolution, using a simple similarity degree computation technique, and executing processing at a low frequency.

10. The information processing apparatus according to claim 7, wherein comparison is made between similarity degrees on the basis of which corresponding blocks are determined at the time of block matching corresponding to an approximate value of each position, and data of a depth image generated by the block matching higher in similarity degree is employed, thereby composing depth images.

11. The information processing apparatus according to claim 1, further comprising: an output information generation block configured to execute predetermined information processing on the basis of the information of said position so as to generate output data.

12. An information processing method by an information processing apparatus, comprising:
acquiring, from an imaging apparatus, data of stereo images with a same space taken by left and right cameras having a known interval there between; and
detecting corresponding points by executing block matching on a reference block set to one of said stereo images for detecting an area having a high similarity degree within a search range set to the other of said stereo images, generating information of a position including a distance of a target from the camera on the basis of an obtained parallax, and outputting the generated information,
wherein said step of generating the information of said position executes said block matching after once adjusting and determining a start position and a length of said search range on the basis of an approximate value of said position of an acquired target, thereby generating final information of said position of the same target,
wherein said step of generating the information includes estimating a distance of a target so as to acquire said approximate value, and
wherein said step of estimating the distance includes acquiring a distance of an object to be imaged from the camera by executing block matching on said stereo images in a search range wider than a search range in generating information of said final position, generating a depth image with the acquired distance indicative of a pixel value on an image plane, and estimating a distance of said target by applying an area of a figure of the target detected from one of said stereo images.

13. A non-transitory, computer-readable recording medium containing a computer program, which when executed by a computer, causes the computer to carry out actions, comprising:
acquiring, by an image acquisition block, data of stereo images with a same space taken by left and right cameras having a known interval there between; and
detecting, by a positional information generation block, corresponding points by executing block matching on a reference block set to one of said stereo images for detecting an area having a high similarity degree within a search range set to the other of said stereo images, generating information of a position including a distance of a target from the camera on the basis of an obtained parallax, and outputting the generated information,
wherein said step of generating the information of said position executes said block matching after once adjusting and determining a start position and a length of said search range on the basis of an approximate value of said position of an acquired target, thereby generating final information of said position of the same target,
wherein said step of generating the information includes estimating a distance of a target so as to acquire said approximate value, and
wherein said step of estimating the distance includes acquiring a distance of an object to be imaged from the camera by executing block matching on said stereo images in a search range wider than a search range in generating information of said final position, generating a depth image with the acquired distance indicative of a pixel value on an image plane, and estimating a distance of said target by applying an area of a figure of the target detected from one of said stereo images.

* * * * *